United States Patent
Palich et al.

(10) Patent No.: US 11,370,100 B2
(45) Date of Patent: *Jun. 28, 2022

(54) CONTROL AND POWER MODULE FOR DRIVING A BRUSHLESS MOTOR IN A POWER TOOL

(71) Applicant: Black & Decker Inc., New Britain, CT (US)

(72) Inventors: Andrew M. Palich, Ellicott City, MD (US); Michael R. Marjomaa, Mount Wolfe, PA (US); Kevin L. Pulley, White Marsh, MD (US); David J. Smith, Columbia, MD (US); Dennis A. Bush, Dillsburg, PA (US); Mark T. Cherry, White Marsh, MD (US); Scott Eshlemann, Timonium, MD (US); Tal Gottesman, Parkville, MD (US)

(73) Assignee: Black & Decker Inc., New Britain, CT (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/460,187

(22) Filed: Jul. 2, 2019

(65) Prior Publication Data
US 2019/0321961 A1    Oct. 24, 2019

Related U.S. Application Data

(63) Continuation of application No. 15/335,568, filed on Oct. 27, 2016, now Pat. No. 10,603,777.
(Continued)

(51) Int. Cl.
*B25F 5/00* (2006.01)
*B23D 45/04* (2006.01)
(Continued)

(52) U.S. Cl.
CPC ............ *B25F 5/008* (2013.01); *B23D 45/044* (2013.01); *B25F 5/02* (2013.01); *H01M 10/42* (2013.01);
(Continued)

(58) Field of Classification Search
CPC ......... B25F 5/008; B25F 5/02; H02K 11/215; H02K 11/33; H02K 7/145; B23D 45/044;
(Continued)

(56) References Cited

U.S. PATENT DOCUMENTS 5,119,466 A * 6/1992 Suzuki .................... H02K 9/22
310/68 R
5,430,931 A * 7/1995 Fisher .................... H02K 5/225
29/596
(Continued)

*Primary Examiner* — Nathaniel C Chukwurah
*Assistant Examiner* — Lucas E. A. Palmer
(74) *Attorney, Agent, or Firm* — Amir R. Rohani

(57) ABSTRACT

A power tool is provided including a motor housing having a substantially-cylindrical main body having an open end and a rear end. A brushless DC motor is provided including a stator assembly received through the open end of the motor housing and secured within the main body of the motor housing. A motor control and power module disposed proximate the rear end of the motor housing includes a printed circuit board (PCB) on which power switch and a controller are mounted. A mounting bracket is secured to the motor housing at the rear end to support the module such that the PCB is substantially parallel to the rear end. The mounting bracket includes a mating portion projecting axially to come to contact with the motor housing around the rear end to structurally support the mounting bracket with respect to the motor housing.

18 Claims, 20 Drawing Sheets

Related U.S. Application Data

(60) Provisional application No. 62/358,732, filed on Jul. 6, 2016, provisional application No. 62/248,798, filed on Oct. 30, 2015.

(51) Int. Cl.
  *B25F 5/02* (2006.01)
  *H01M 10/42* (2006.01)
  *H02K 11/215* (2016.01)
  *H02K 11/33* (2016.01)
  *H02K 7/14* (2006.01)

(52) U.S. Cl.
  CPC ........... *H02K 7/145* (2013.01); *H02K 11/215* (2016.01); *H02K 11/33* (2016.01); *H01M 2010/4271* (2013.01); *H01M 2220/30* (2013.01)

(58) Field of Classification Search
  CPC ......... H01M 10/42; H01M 2010/4271; H01M 2220/30
  See application file for complete search history.

(56) References Cited

U.S. PATENT DOCUMENTS

| | | | | |
|---|---|---|---|---|
| 6,011,331 | A * | 1/2000 | Gierer | H02K 29/06 310/52 |
| 7,075,257 | B2 * | 7/2006 | Carrier | H02P 3/12 318/375 |
| 7,270,910 | B2 * | 9/2007 | Yahnker | H01M 10/6561 429/62 |
| 8,004,135 | B2 * | 8/2011 | Peterson | H02K 11/33 310/89 |
| 2003/0163924 | A1 * | 9/2003 | Hempe | H02K 7/145 30/388 |
| 2005/0167183 | A1 * | 8/2005 | Tominaga | H05K 7/1432 180/444 |
| 2008/0106159 | A1 * | 5/2008 | Yoshida | A01G 3/088 310/50 |
| 2010/0221594 | A1 * | 9/2010 | Roßkamp | B25F 5/02 429/100 |
| 2010/0283332 | A1 * | 11/2010 | Toukairin | H02K 11/33 310/50 |
| 2011/0079407 | A1 * | 4/2011 | Iimura | B25B 23/1475 173/2 |
| 2011/0227430 | A1 * | 9/2011 | Omori | H02K 11/215 310/50 |
| 2011/0248583 | A1 * | 10/2011 | O'Banion | H02K 5/18 310/50 |
| 2011/0316371 | A1 * | 12/2011 | Dietl | H02K 3/50 310/71 |
| 2012/0292070 | A1 * | 11/2012 | Ito | H02K 11/35 173/217 |
| 2012/0293103 | A1 * | 11/2012 | Forster | H02P 27/08 318/503 |
| 2012/0319508 | A1 * | 12/2012 | Oomori | B25F 5/02 310/50 |
| 2013/0193891 | A1 * | 8/2013 | Wood | H02P 6/08 318/434 |
| 2013/0200733 | A1 * | 8/2013 | Lau | B25F 5/008 310/50 |
| 2013/0313925 | A1 * | 11/2013 | Mergener | H02K 11/215 310/50 |
| 2013/0335095 | A1 * | 12/2013 | Kiuchi | B60L 3/0046 324/426 |
| 2014/0084718 | A1 * | 3/2014 | Naito | B26B 25/00 310/50 |
| 2014/0131059 | A1 * | 5/2014 | Verbrugge | B25F 5/02 173/217 |
| 2014/0215839 | A1 * | 8/2014 | Abe | B23Q 11/126 30/388 |
| 2014/0265664 | A1 * | 9/2014 | Camilleri | H02K 9/22 310/59 |
| 2014/0292245 | A1 * | 10/2014 | Suzuki | B25F 5/00 318/478 |
| 2014/0361645 | A1 * | 12/2014 | Beyerl | H02K 11/33 310/50 |

* cited by examiner

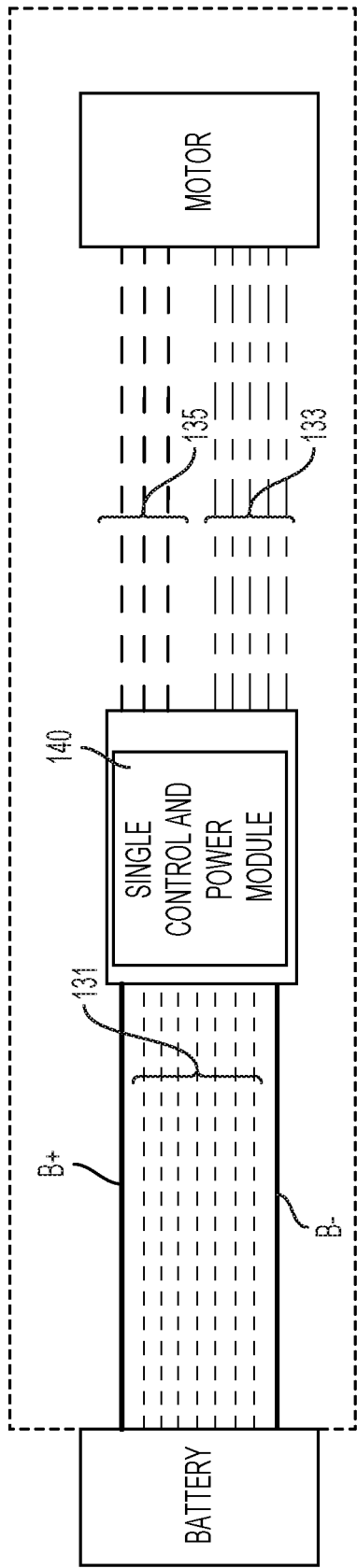
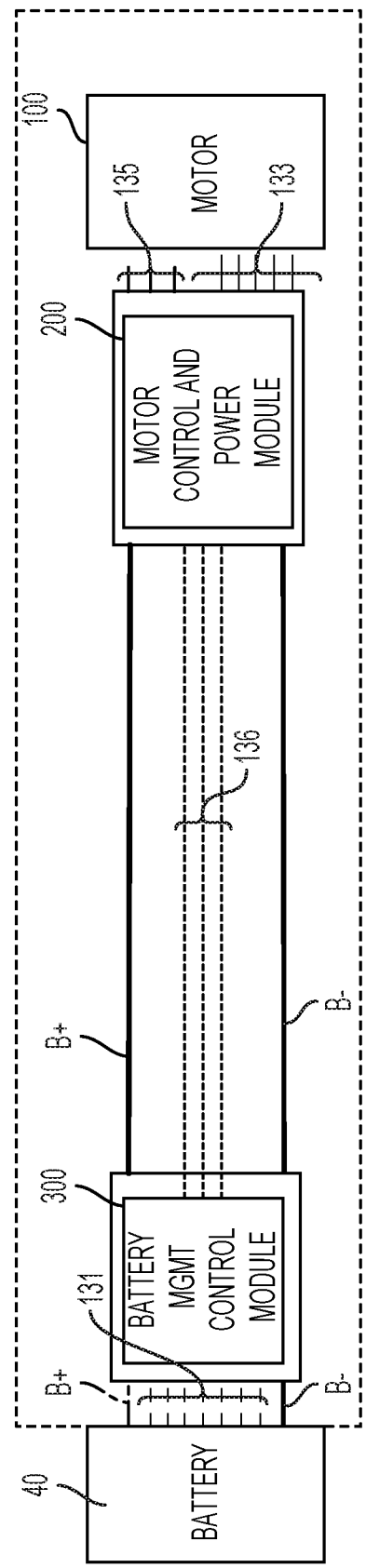
FIG. 2
PRIOR ART
FIG. 3

CONTROL AND POWER MODULE FOR DRIVING A BRUSHLESS MOTOR IN A POWER TOOL

CROSS-REFERENCE TO RELATED APPLICATIONS

This application is a continuation of co-pending U.S. patent application Ser. No. 15/335,568 filed Oct. 27, 2016, which claims the benefit of U.S. Provisional Application No. 62/248,798 filed Oct. 30, 2015, and U.S. Provisional Application No. 62/358,732 filed Jul. 6, 2016, all of which are incorporated herein by reference in their entireties.

FIELD

This disclosure relates to high-power power tools having brushless motors, and in particular to a brushless motor and associated control and power module for a high-power power tool.

BACKGROUND

Cordless power tools provide many advantages to traditional corded power tools. In particular, cordless tools provide unmatched convenience and portability. An operator can use a cordless power tool anywhere and anytime, regardless of the availability of a power supply. In addition, cordless power tools provide increased safety and reliability because there is no cumbersome cord to maneuver around while working on the job, and no risk of accidently cutting a cord in a hazardous work area.

However, conventional cordless power tools still have their disadvantages. Typically, cordless power tools provide far less power as compared to their corded counterparts. Today, operators desire power tools that provide the same benefits of convenience and portability, while also providing similar performance as corded power tools.

Brushless DC (BLDC) motors have been used in recent years in various cordless power tools. While BLDC motors provide many advantages over universal and permanent magnet DC motors, challenges exist in incorporating BLDC motors into many power tools depending on power requirements and specific applications of tool. The power components needed for driving the BLDC motors in high power applications have conventionally generated too much heat, making BLDC motors unfeasible for high-power power tools. Furthermore, high power applications typically require larger motors. As power tools have become more ergonomically compact, it has become more desirable to reduce the size of the motor while providing the required power output.

SUMMARY

According to an aspect of the invention, a power tool is provided including a tool housing; at least one battery receptacle accommodated on the tool housing, the battery receptacle being adapted to receive a battery pack having a maximum voltage of at least 60 volts; and a brushless DC (BLDC) motor disposed within the tool housing, the motor including a stator assembly and a rotor assembly rotatably disposed within the stator assembly. In an embodiment, the power tool includes a motor control and power module disposed in close proximity to the motor, including a power switch circuit electrically coupled to the motor and a first controller configured to control a switching operation of the power switch circuit for supply of power from the battery pack to the motor. In an embodiment, the power tool further includes a battery management control module disposed in close proximity to the battery receptacle, including a second controller distinct from the first controller, the second controller configured to manage an operation of the battery pack.

In an embodiment, battery control wires are provided connecting the battery receptacle to the battery management control module, and motor drive wires are provided connecting the motor control and power module to the motor.

In an embodiment, the battery management control module further includes a power supply regulator configured to output a power line having a lower voltage than the battery pack to the first and second controllers.

In an embodiment, the motor control and power module comprises a first printed circuit board (PCB) on which the power switch circuit and the first controller are mounted, and the battery management control module comprises a second printed circuit board (PCB) on which the second controller is mounted.

In an embodiment, the power tool further includes a substantially-cylindrical motor housing including an open end for receiving the stator assembly and a rear end, and a mounting bracket at or near the rear end of the motor housing, where the mounting bracket supports the motor control and power module such that the first PCB is substantially parallel to the rear end of the motor housing.

In an embodiment, the battery management control module includes a module housing longitudinally disposed along an outer surface of the stator such that the second PCB is substantially parallel to an axis of the motor.

In an embodiment, the mounting bracket includes a substantially cylindrical portion arranged to mate around a circumferential portion of the motor housing at or near the rear end of the motor housing, a planar portion extending radially outwardly from the cylindrical portion, and mount posts located around the planar portion.

In an embodiment, the power tool further includes a rear cover configured to mate with the mount posts to support the motor control and power module proximate the rear end of the motor housing.

In an embodiment, the power switch circuit includes a plurality of Insulated-Gate Bipolar Transistors (IGBTs) configured as a three-phase bridge driver circuit, and at least one heat sink mounted on the first PCB in thermal communication with the IGBTs, the rear cover and the mounting bracket together defining at least one peripheral opening adjacent the motor control and power module to allow passage of air to the heat sink.

In an embodiment, the motor further includes a fan rotatably coupled to the rotor assembly, and the rear end of the motor housing includes at least one opening to provide fluid communication between the motor fan and the motor control and power module.

According to another aspect of the invention, a power tool is provided including a tool housing; a brushless DC (BLDC) motor disposed within the tool housing, the motor including a stator assembly and a rotor assembly rotatably disposed within the stator assembly; and a substantially-cylindrical motor housing having an open end for receiving the stator assembly and a rear end. In an embodiment, the power tool further includes a motor control and power module disposed in close proximity to the motor, the motor control and power module comprising a printed circuit board (PCB), a power switch circuit electrically mounted on the PCB and coupled to the motor, and a controller also mounted on the PCB and configured to control a switching operation of the power switch circuit for supply of power from a power source to the motor. In an embodiment, a mounting bracket is provided at or near the rear end of the motor housing, the mounting bracket supporting the motor control and power module such that the PCB is disposed substantially parallel to the rear end of the motor housing.

In an embodiment, the mounting bracket includes a substantially cylindrical portion arranged to mate around a circumferential portion of the motor housing at or near the rear end of the motor housing.

In an embodiment, the motor housing includes guide rails on its outer surface, and the cylindrical portion comprises legs that slidingly mate with the guide rails of the motor housing.

In an embodiment, the mounting bracket further includes a planar portion extending radially outwardly from the cylindrical portion, and mount posts located around the planar portion. In an embodiment, mount posts extend outwardly at an angle from the planar portion.

In an embodiment, the power tool further includes a rear cover configured to mate with the plurality of mount posts to support the motor control and power module proximate the rear end of the motor housing.

In an embodiment, the power switch circuit includes a plurality of Insulated-Gate Bipolar Transistors (IGBTs) configured as a three-phase bridge driver circuit, and at least one heat sink mounted on the PCB in thermal communication with the IGBTs, the rear cover and the mounting bracket together defining at least one peripheral opening adjacent the motor control and power module to allow passage of air to the heat sink.

In an embodiment, two heat sinks are provided, each heat sink including a curved surface that substantially covers a side surface and a top surface of the corresponding IGBTs, and fins projecting outwardly from the curved surface.

In an embodiment, the motor further comprises a fan rotatably coupled to the rotor assembly, and the rear end of the motor housing includes at least one opening to provide fluid communication between the motor fan and the motor control and power module.

In an embodiment, the mounting bracket comprises wire routing and retention features on an inner portion thereof for receiving motor wires from the motor.

According to another aspect of the invention, a power tool is provided including a tool housing and a brushless DC (BLDC) motor disposed within the tool housing, where the motor includes a stator assembly, and a rotor assembly rotatably disposed within the stator assembly. In an embodiment, the rotor assembly includes a rotor shaft, a rotor lamination stack mounted on the rotor shaft to rotate therewith, a rear bearing arranged at a distal end of the rotor shaft, and a sense magnet disposed between the rear bearing and the rotor lamination stack to rotate with the rotor lamination stack. In an embodiment, the power tool further includes a substantially-cylindrical motor housing having an open end for receiving the stator assembly and a rear end, the motor housing including a substantially-cylindrical bearing pocket formed in its rear end to receive the rear bearing of the motor therein, and a radially-extending slot formed at or near its rear end. In an embodiment, a positional sensor board is radially received within the slot, the positional sensor board having a curved inner edge shaped to be positioned in contact with the bearing pocket, the positional sensor board including positional sensors mounted around the curved inner edge and facing the sense magnet. In an embodiment, the curved inner edge of the positional sensor board is on a corner portion thereof to give the positional sensor board an asymmetric shape.

In an embodiment, a receiving axis of the slot is offset with respect to a center of the bearing pocket.

In an embodiment, the bearing pocket includes a cylindrically-shaped member located outwardly from the rear end of the motor housing away from the rotor assembly and supported via angular legs.

In an embodiment, the slot is formed as a recess in an outer surface of the rear end of the motor housing.

In an embodiment, the motor housing includes guides and retention features around the slot to racially receive and retain the positional sensor board within the slot.

In an embodiment, the power tool further includes a bracket mounted at or near the rear end of the motor housing, the bracket including at least one axial finger arranged to hold the positional sensor board within the slot.

BRIEF DESCRIPTION OF THE DRAWINGS

The drawings described herein are for illustration purposes only and are not intended to limit the scope of this disclosure in any way.

The drawings described herein are for illustration purposes only and are not intended to limit the scope of this disclosure in any way.

FIG. 2 depicts a simplified conceptual block diagram of a conventional control scheme for driving a motor within a DC power tool and controlling the operation of the power tool and the tool battery pack;

FIG. 3 depicts an exemplary conceptual block diagram of a control scheme for driving a motor within a DC power tool and controlling the operation of the power tool and the tool battery pack, according to an embodiment;

Corresponding reference numerals indicate corresponding parts throughout the several views of the drawings.

DETAILED DESCRIPTION

Reference is initially made to application Ser. No. 14/715,258 filed May 18, 2015, which is incorporated herein by reference in its entirety, for detailed description of a power tool system including high-power (i.e. 60V or above) DC-only or AC/DC power tools having brushless DC (BLDC) motors. Reference is also made to application Ser. No. 14/057,003 filed Oct. 13, 2013 (published as US. Pub. No. 2015/0111480), for detailed description of an exemplary AC powered power tool having a BLDC motor. This disclosure describes a motor and power module assembly that may be utilized in various high-power AC-only, DC-only, or AC/DC power tools having BLDC motors. Examples of such tools include, but are not limited to, hammer drills, concrete nailers, miter saws, grinders, etc.

Figure 1:
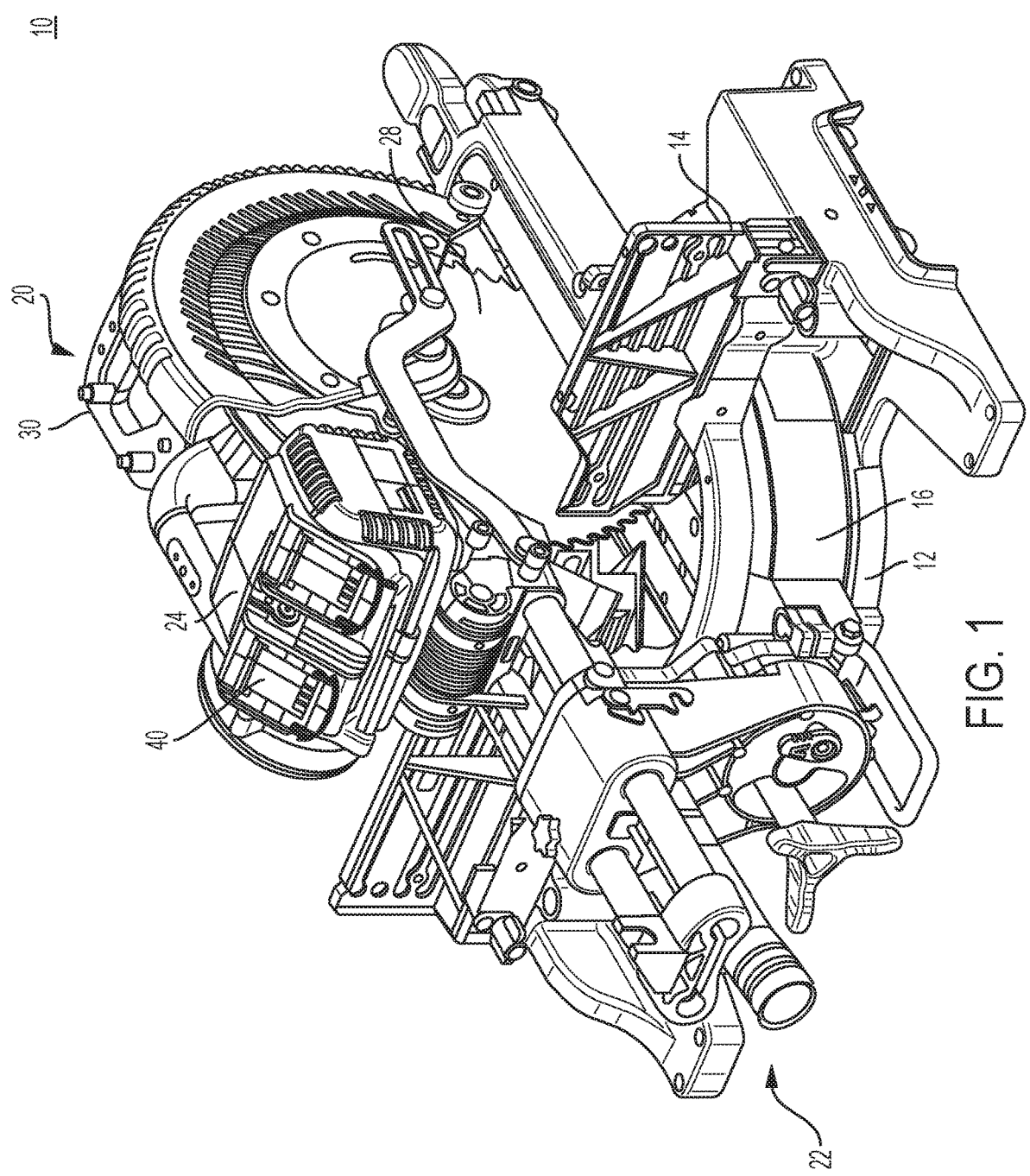
FIG. 1 depicts an exemplary perspective view of a high-power power tool, according to an embodiment.

FIG. 1 depicts an exemplary high-power power tool, in this case a miter saw 10, according to an embodiment. In an embodiment, miter saw 10 has a generally circular base 12 with an attached fence 14, which base supports a rotatable table 16 that is rotatably adjustable for setting the miter angle of the work piece placed on the table 16. A saw blade and motor assembly, indicated generally at 20, is operatively connected to the table 16 by a linear guide mechanism, indicated generally at 22. The saw blade and motor assembly 20 includes a tool housing 24 housing an electric motor that is operatively connected through a belt and gear mechanism, not shown but located within housing portion 26 that drives a saw blade 28. A handle 30 enables an operator to move the blade and motor assembly 20 into and out of engagement with a work piece that may be placed on the table 16 adjacent the fence 14.

The miter saw as illustrated in FIG. 1 is illustrative and the teachings of this disclosure may apply to any miter saw, or any other high-power power tool. For more details about an exemplary miter saw, reference is made to U.S. Pat. No. 8,631,734, which is incorporated herein by reference in its entirety.

In an embodiment, the power tool 10 of the present disclosure may include one or more battery receptacles 40. Battery receptacles 40 may receive two battery packs (e.g., two 60V max battery packs, or two 20/60V max battery packs configured in their 60V max configuration) and connect the two battery packs in series for a total of 120 VDC. Alternatively, the battery receptacle may be adapted to receive an adaptor pack that is coupled to an AC power source and provides AC power, through the battery receptacle 40 terminals, to the power tool 10. Details of a high-power DC, or a high-power AC/DC power tool system, including the battery pack and adaptor configurations, is described in PCT Application Publication No. WO 2015/179318, which is incorporated herein by reference in its entirety.

FIG. 2 depicts a simplified conceptual block diagram of a conventional control scheme for driving a motor within a DC power tool and controlling the operation of the power tool and the tool battery pack. In this diagram, a single control and power module 38 for management of the battery and power tool is provided. This module 38 is located at a location between the battery receptacle(s) and the motor, and includes a micro-controller that handles all aspects of the tool and battery management, including, but not limited to, monitoring and managing the tool and battery voltage, current, temperature, and other parameters. For example, the micro-controller receives battery control wires 131 (voltage and temperature sense signals) from the battery pack(s). In the event the voltage of the battery cells is below a certain voltage threshold, or if the battery temperature is above a certain temperature threshold, the microcontroller shuts down power from the battery pack(s). The micro-controller also communicates with the motor via motor control wires 133, including motor positional signals (e.g., Hall signals) received by the micro-controller from the motor. The micro-controller accordingly controls the supply electric power via three motor drive wires 135 corresponding to the three phases of the motor. The micro-controller controls the motor commutation via a series of power switches within the module 38, as described later in detail.

In large battery-operated power tools such as miter saws, particularly those that require high voltage power lines of, for example, 120V or 230V voltage to supply power from the battery receptacle(s) to the motor, long battery control wires 131 and motor control wires 133 between the control and power module 38, the battery pack(s), and the motor create significant electromagnetic noise. This noise often cause inaccurate reading of the motor positional signals and the battery sense signals by the micro-controller.

According to an embodiment of the invention, in order to reduce electromagnetic noise in such power tools, two separate control modules are provided, as depicted in the simplified block diagram of FIG. 3. In this embodiment, a battery management control module 300 is provided in close proximity to the tool battery receptacle 40. All the battery voltage and sense signals 130 are provided directly from the battery receptacle 40 to the battery management control module 300. Moreover, in an embodiment, motor control and power module 116 is provided in close proximity to the motor 110. As discussed below, this module 116 may be secured via a mounting bracket to the end of the motor 110. All motor control wires 133 and motor drive wires 135 arranged between the motor control and power module 116 and the motor 110 are comparatively short. The two modules 116 and 300 communicate via a series of low-voltage signals 136. In this embodiment, the length of the motor control wires 133 and battery control wires 131 is significantly decreased. This reduces the amount of electromagnetic noise on the motor control wires 133 and battery control wires 131, allowing the motor control and power module 116 and battery management control module 300 to receive motor and battery management signals more accurately.

Figure 4:
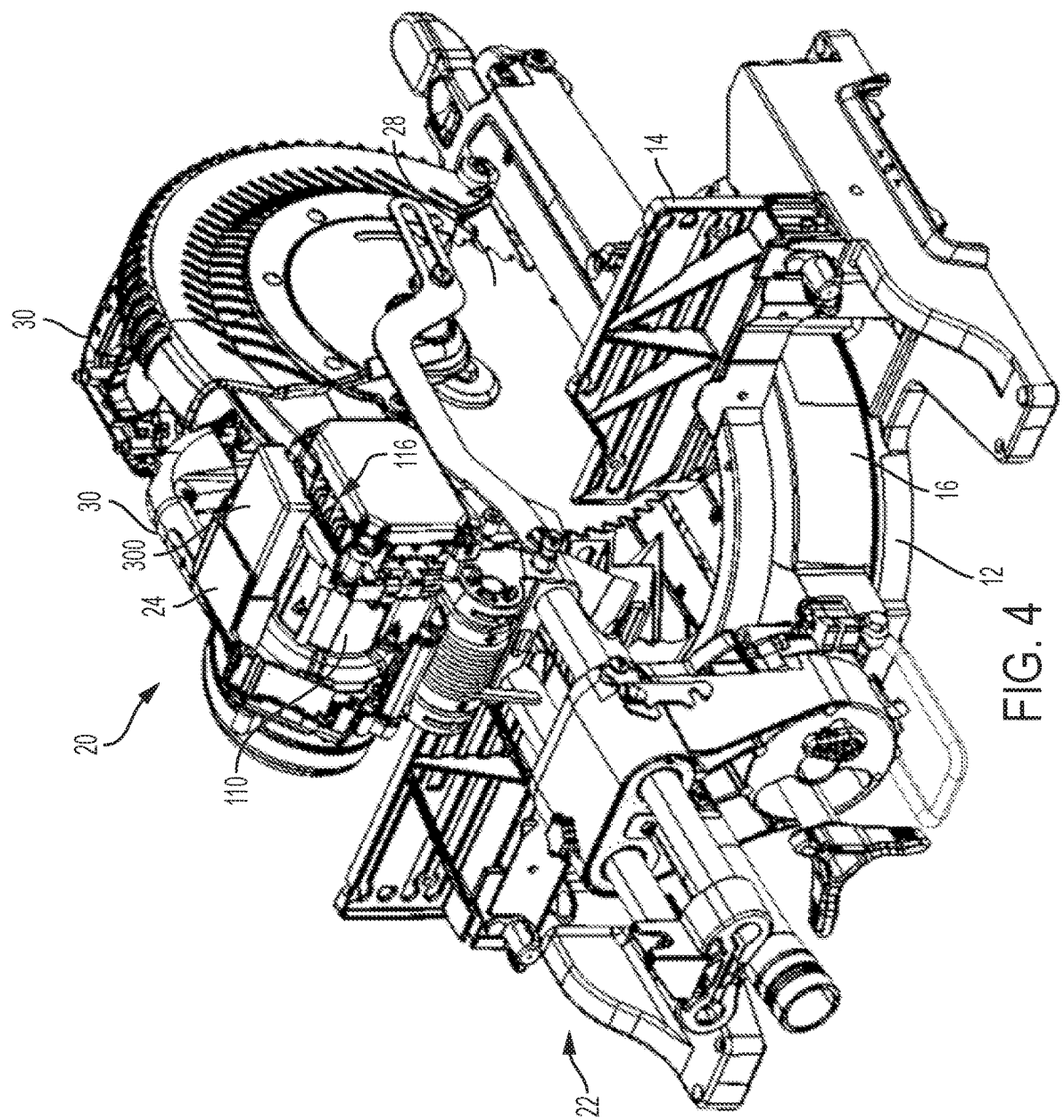
FIGS. 4 and 5 depict perspective views of the power tool of FIG. 1 with the housing and battery receptacles partially removed to show power tool motor, motor control and power module, and battery management control module, according to an embodiment.
Figure 5:
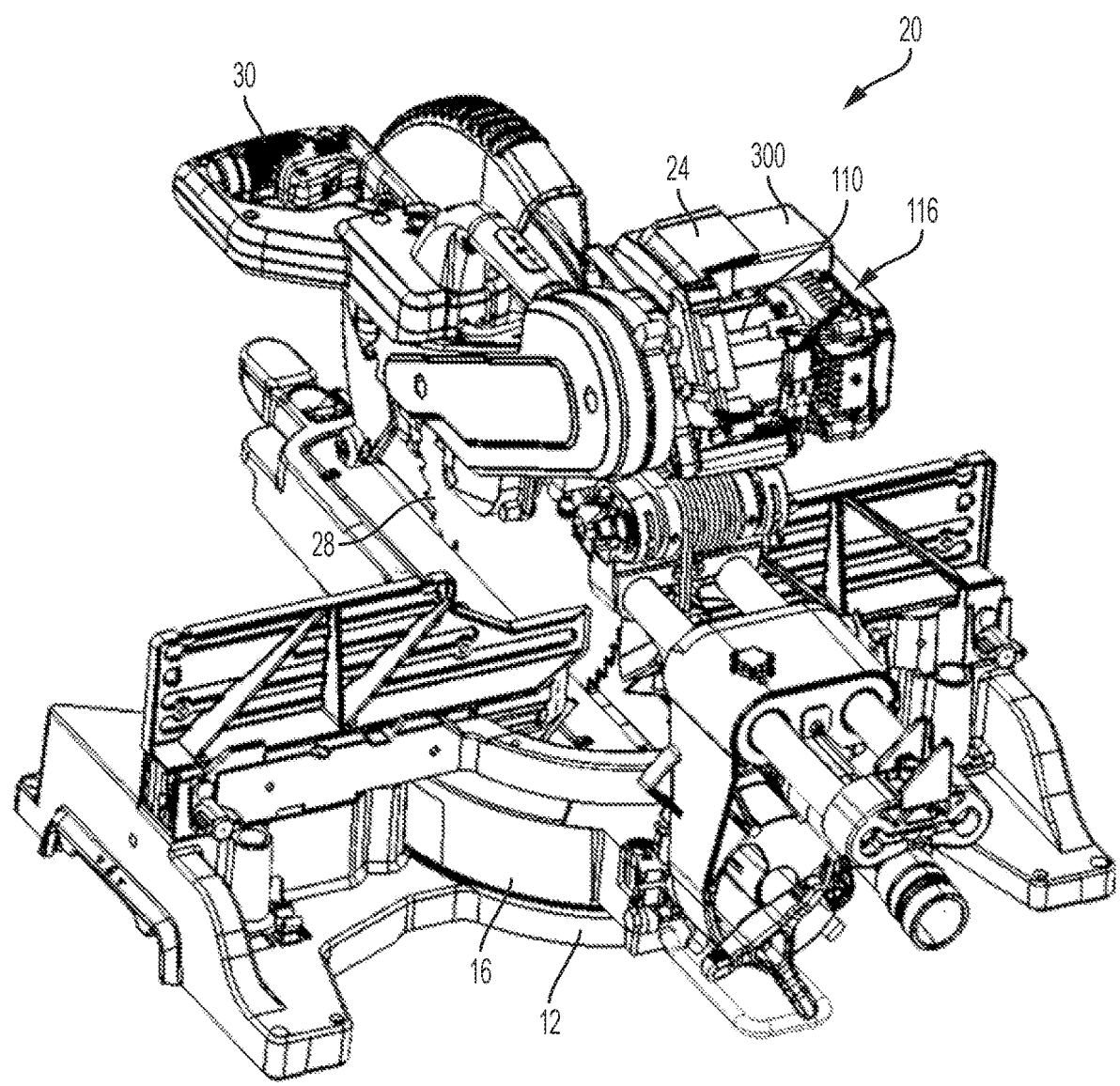

FIGS. 4 and 5 depict two perspective views of tool 10, with the tool housing 24 and battery receptacle 40 removed, in an embodiment. As shown in these figures, the motor control and power module 116 is secured to the end of the motor 110 substantially parallel to the end of the motor 110, whereas the battery management control module 300 is aligned near the battery receptacles 60 along an outer surface of the motor 110 parallel to an axis of rotation of the motor 110.

Figure 6:
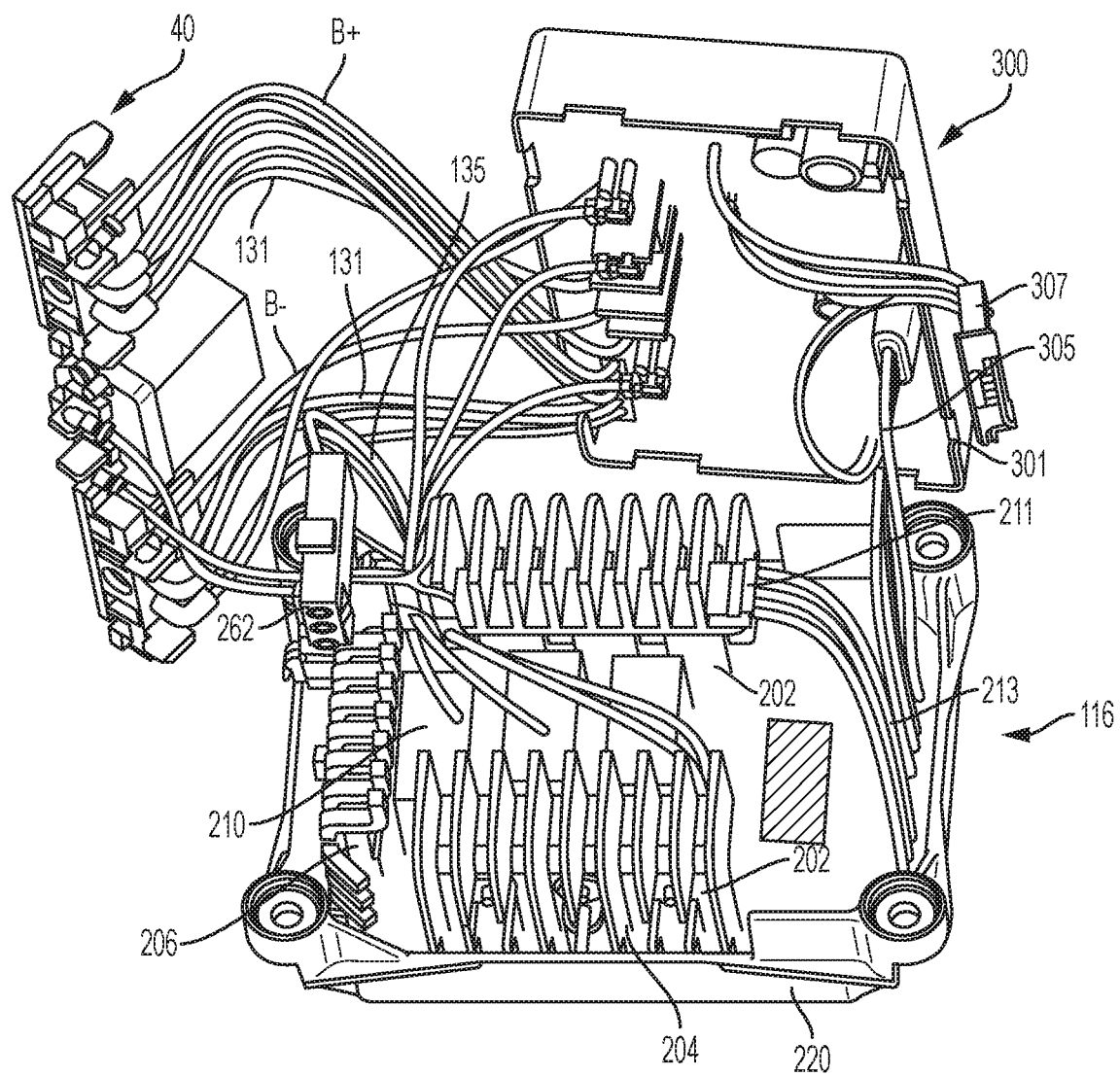
FIG. 6 depicts a perspective view of the control and power module and the battery management control module, according to an embodiment.

Referring now to FIG. 6, a perspective view of the motor control and power module 116 and the battery management control module 300 is provided, according to an embodiment. As shown in this embodiment, motor control and power module 116 includes a series of power switches 202 such as insulated-gate bipolar transistors (IGBTs) configured as a three-phase bridge rectifier for driving the motor. The module 116 further includes a heat sink 204 in close proximity to the power switches 202. The power switches 202 are mounted on a printed circuit board (PCB) (herein covered by a layer of potting 206). A first micro-controller for controlling motor commutation is also mounted on the PCB. Cover 220, together with mounting bracket 114 (see FIG. 2), encapsulate the PCB and the remaining components of motor control and power module 116 at the end of the motor 110. The motor control and power module 116 is described in greater detail later in this disclosure.

In an embodiment, control and power module 116 outputs motor drive wires 135, which connect to the motor terminal via a female connector 262. The module 116 also receives positional (Hall) signals via signal wires 213 connected to the motor hall sensors via another connector 211.

In an embodiment, the battery management control module 300 is coupled to the battery receptacle 40 to receive B+/B− power lines, in addition to battery voltage and temperature sense signals 131. The module 300 includes a housing 301 that houses a PCB on which a second micro-controller for controlling battery and tool management is mounted. Module 300 is coupled to and communicates with motor control and power module 116 via signal wires 305, as discussed below. Module 300 also communicates with additional tool components (e.g., tool LEDs) via connector 307.

In an embodiment, the battery B+ and B− power lines may be provided to the motor control and power module 116 either directly from the battery receptacle 40, or from the battery management control module 300.

Figure 7:
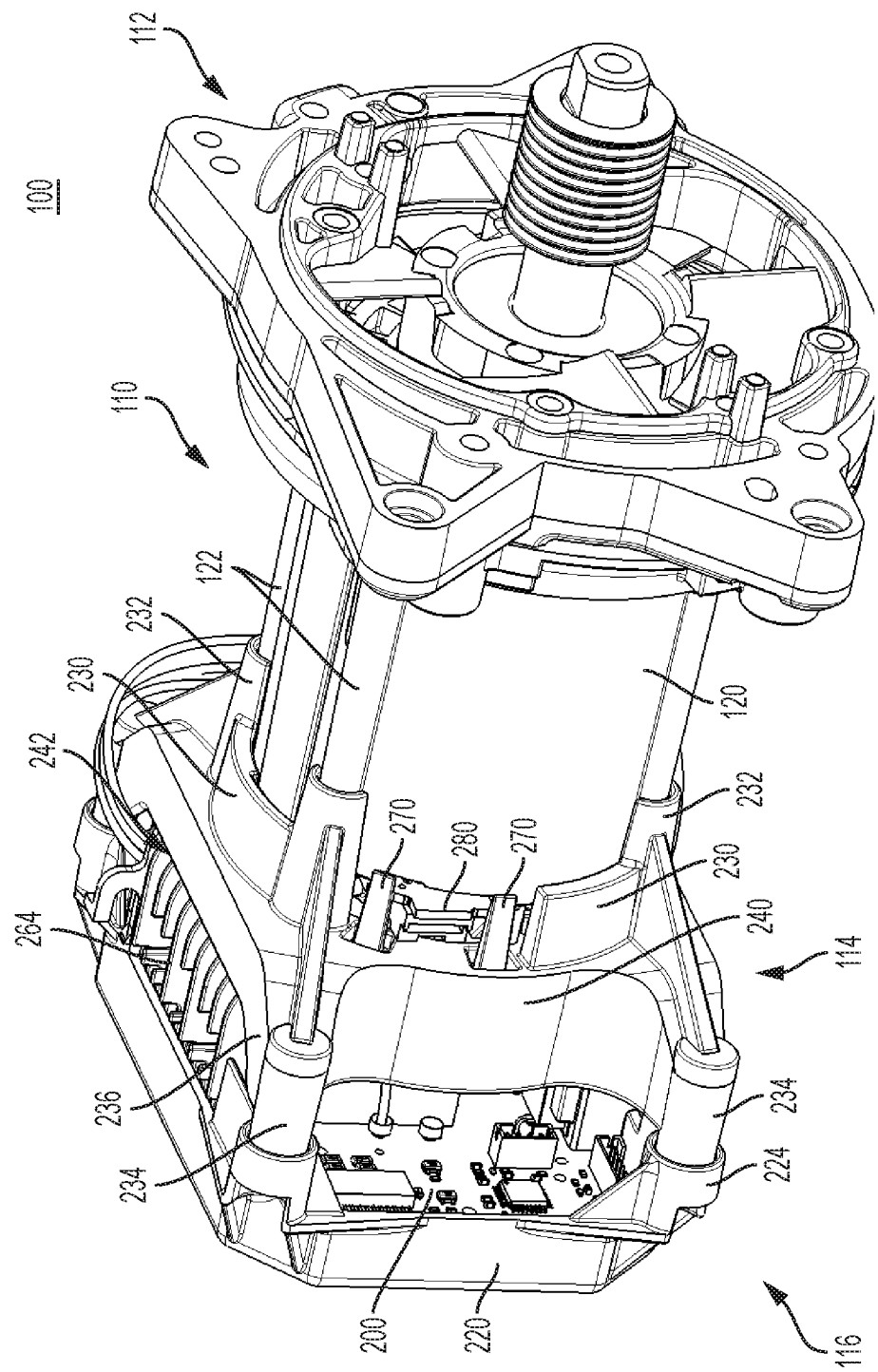
FIGS. 7 and 8 depict perspective views of a motor assembly including a brushless DC motor and the motor control and power module mounted thereto, according to an embodiment.
Figure 8:
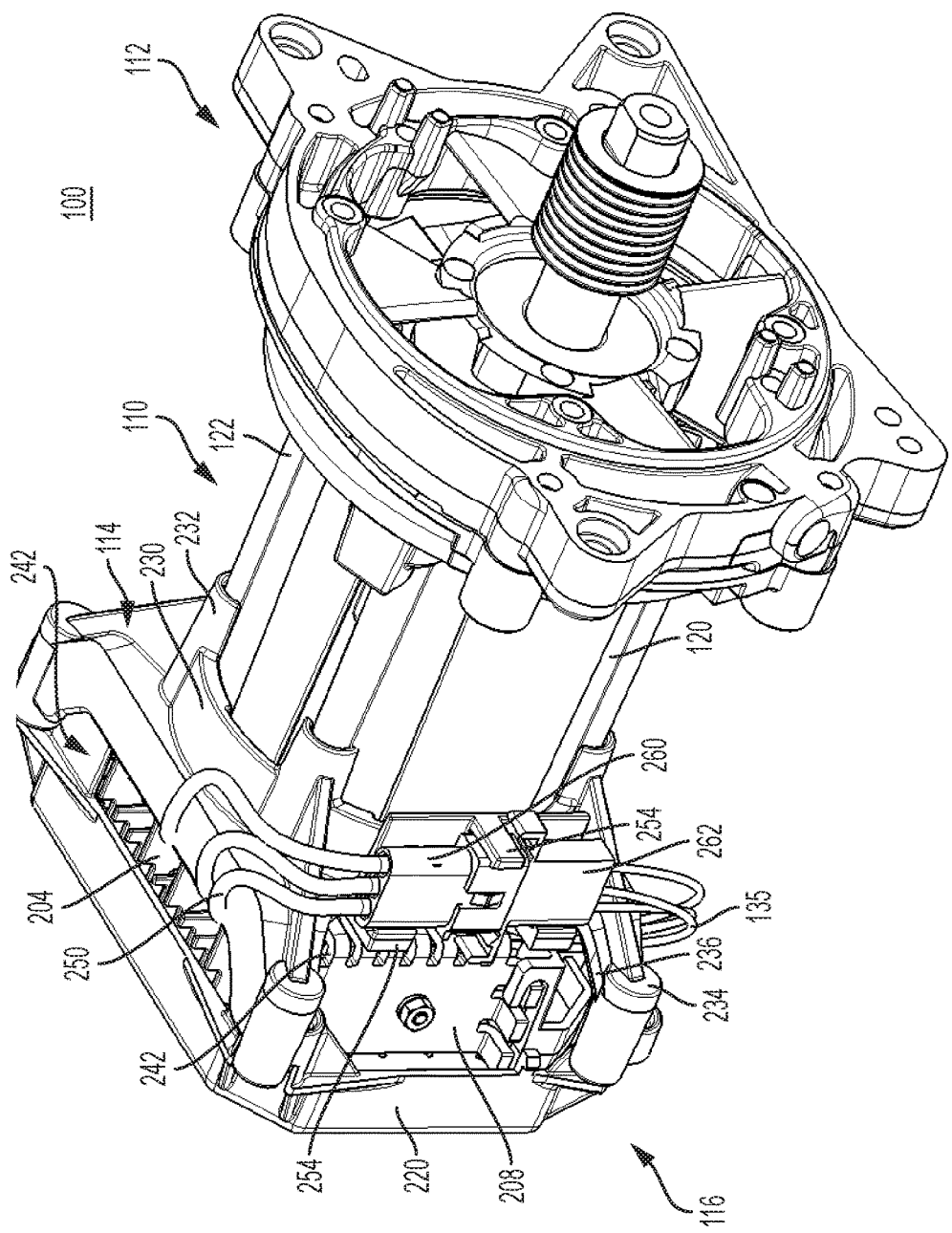

FIGS. 7 and 8 depict perspective front and back views of a motor assembly 100 including brushless DC motor 110 and motor control and power module 116 assembled thereto, according to an embodiment.

Figure 9:
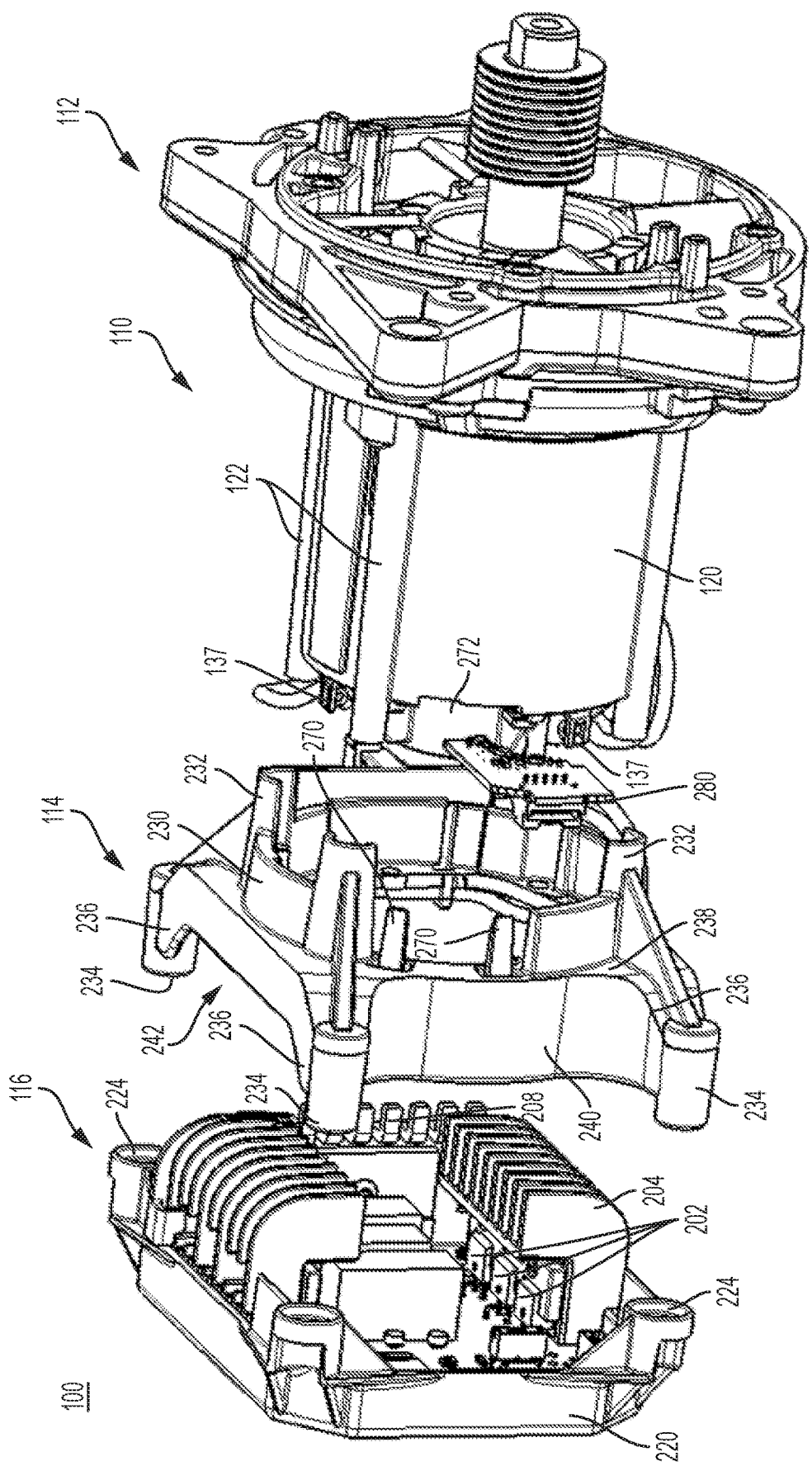
FIG. 9 depicts a partially exploded view of the motor assembly with the control and power module spaced from the motor, according to an embodiment.

FIG. 9 depicts a partially exploded view of the motor assembly 100, wherein control and power module 116 and mounting bracket 114 are shown at a distance from the motor 110.

Figure 10:
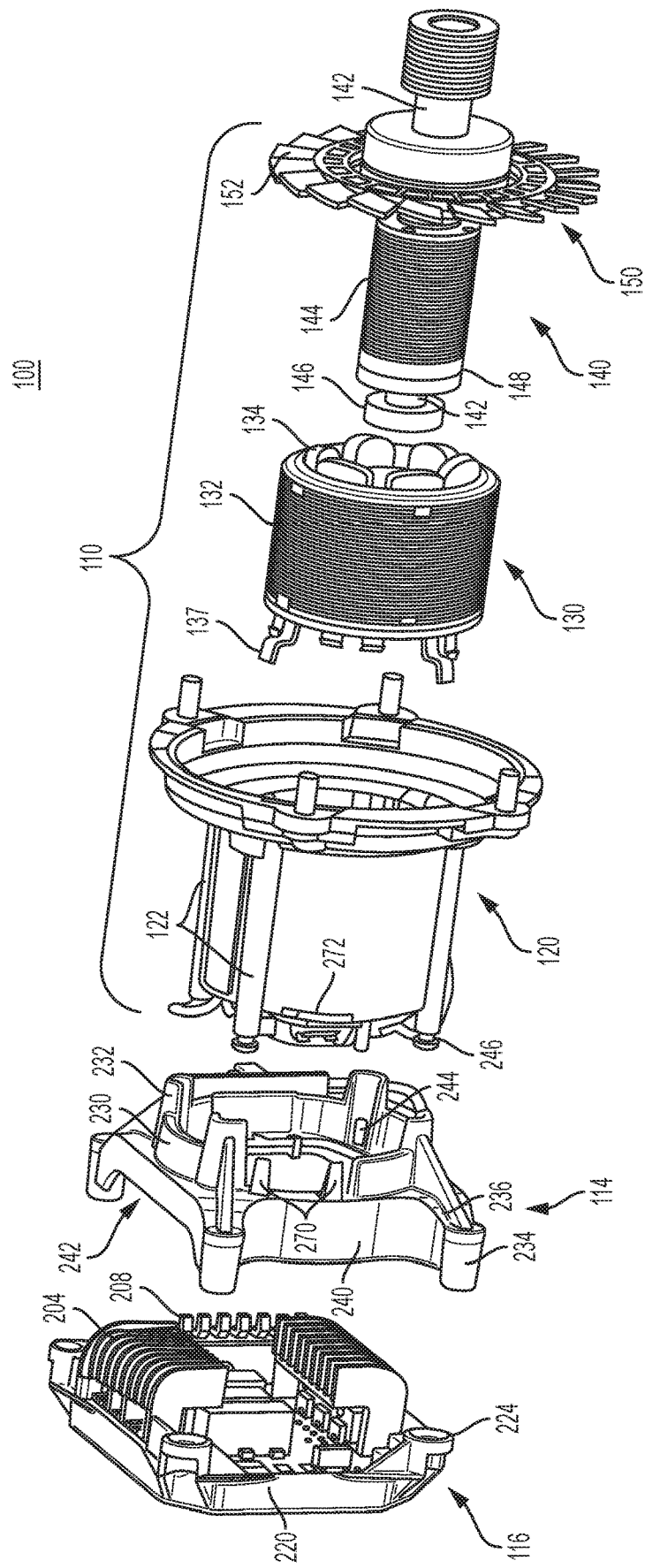
FIG. 10 depicts a fully exploded view of the motor assembly, according to an embodiment.

FIG. 10 depicts an exploded view of the motor assembly 100, where motor 110 components are also shown at a distance.

Referring to all FIGS. 7-10, the details of the motor 110 are discussed herein.

In an embodiment, motor 110 includes a motor housing 120, a mount 112 attached to one end of the motor 110 for securely attaching the motor 110 inside a power tool housing (not shown), a mounting bracket 114 secured on the second end of the motor 110, and control and power module 116 secured to the mounting bracket 114, as described later in detail. In an embodiment, motor 110 is a three-phase brushless DC (BLDC) motor including a stator assembly 130 and a rotor assembly 140 housed within the motor housing 120.

In an embodiment, rotor assembly 140 includes a rotor shaft 142, a rotor lamination stack 144 mounted on and rotatably attached to the rotor shaft 142, a rear bearing 146 arranged at a distal end of the rotor shaft to axially secure the rotor shaft 142 inside a bearing pocket (not shown) of the motor housing 120, a sense magnet ring 148 attached to an end of the rotor lamination stack 144, and fan 150 also mounted on and rotatably attached to the rotor shaft 142.

In an embodiment, the rotor lamination stack 144 may include a series of flat laminations attached together via, for example, an interlock mechanical, an adhesive, an overmold, etc., that house or hold two or more permanent magnets (PMs) therein. The permanent magnets may be surface mounted on the outer surface of the lamination stack 144 or housed therein. The permanent magnets may be, for example, a set of four PMs that magnetically engage with the stator assembly 140 during operation. Adjacent PMs have opposite polarities such that the four PMs have, for example, an N-S-N-S polar arrangement. The rotor shaft 142 is securely fixed to the rotor lamination stack 144.

Rear bearing 146 provides longitudinal support for the rotor 140 assembly. In an embodiment, fan 150 includes a series of blades 152 extending circumferentially to generate air flow through the motor housing 120 as the rotor shaft 142 rotates.

In an embodiment, stator assembly 130 includes a generally cylindrical lamination stack 132 having center bore configured to receive the rotor assembly 140. Lamination stack 132 further includes a plurality of stator teeth around which stator windings 134 are wound. In a three-phase BLDC, windings 134 are coupled in pairs to form three phases of motor 110. Electric energy is supplied to phases of the motor 110 via three input terminals 137 in a controlled fashion, causing the rotor lamination stack 144 to rotate inside the stator lamination stack 132.

In an embodiment, motor housing 120 includes an open end to receive the stator assembly 130 therein. A rear end of the motor housing 120 includes slots (not shown) allowing input terminals 137 of the stator assembly 130 to project outside the rear end of the motor housing 120. Motor housing 120 further includes a bearing pocket (not shown) at its rear end to receive the rear bearing 146, thus securing the rotor assembly 140 inside the stator assembly 130.

Figure 11:
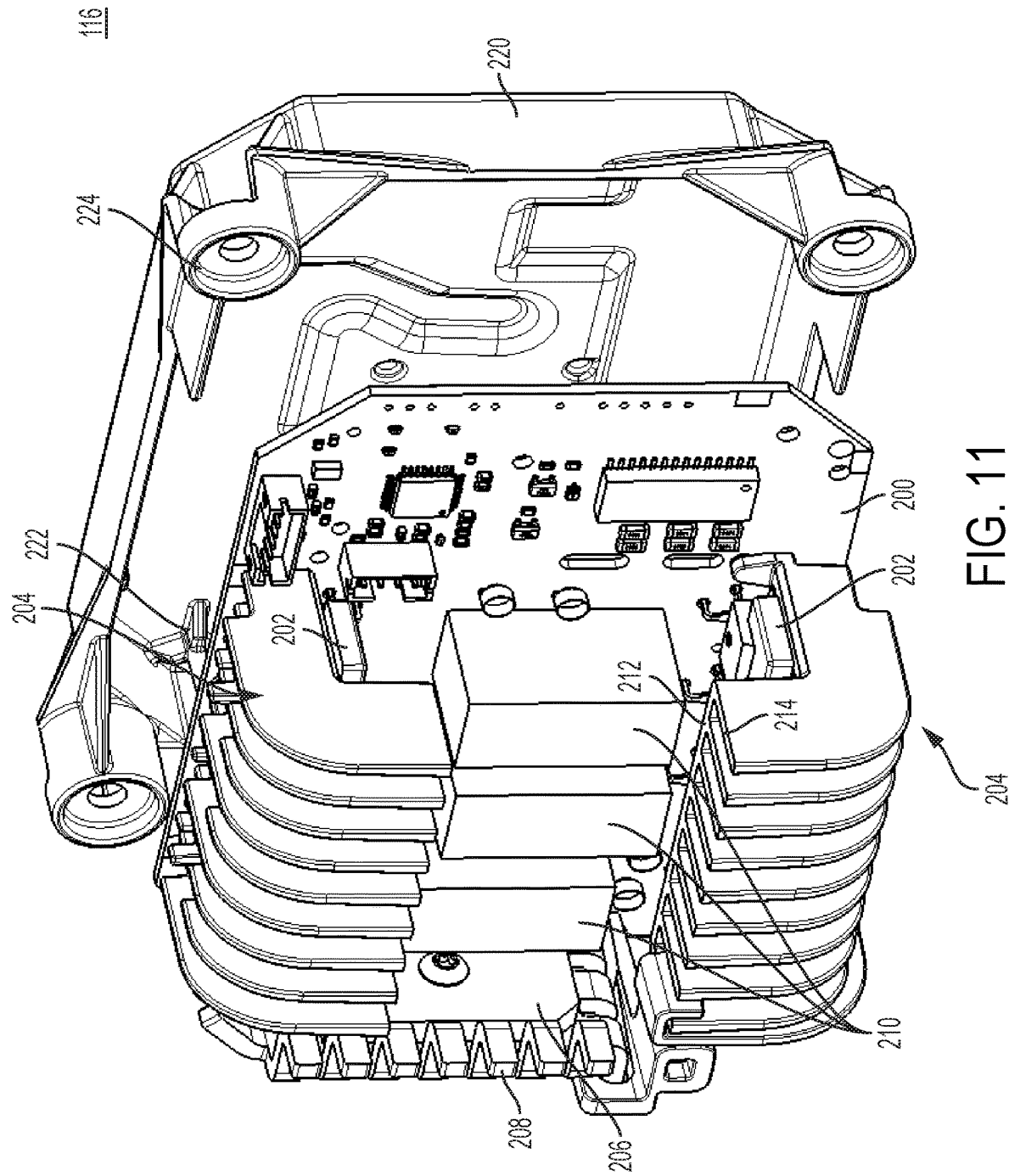
FIGS. 11 and 12 depict exploded perspective views of the motor control and power module, according to an embodiment.
Figure 12:
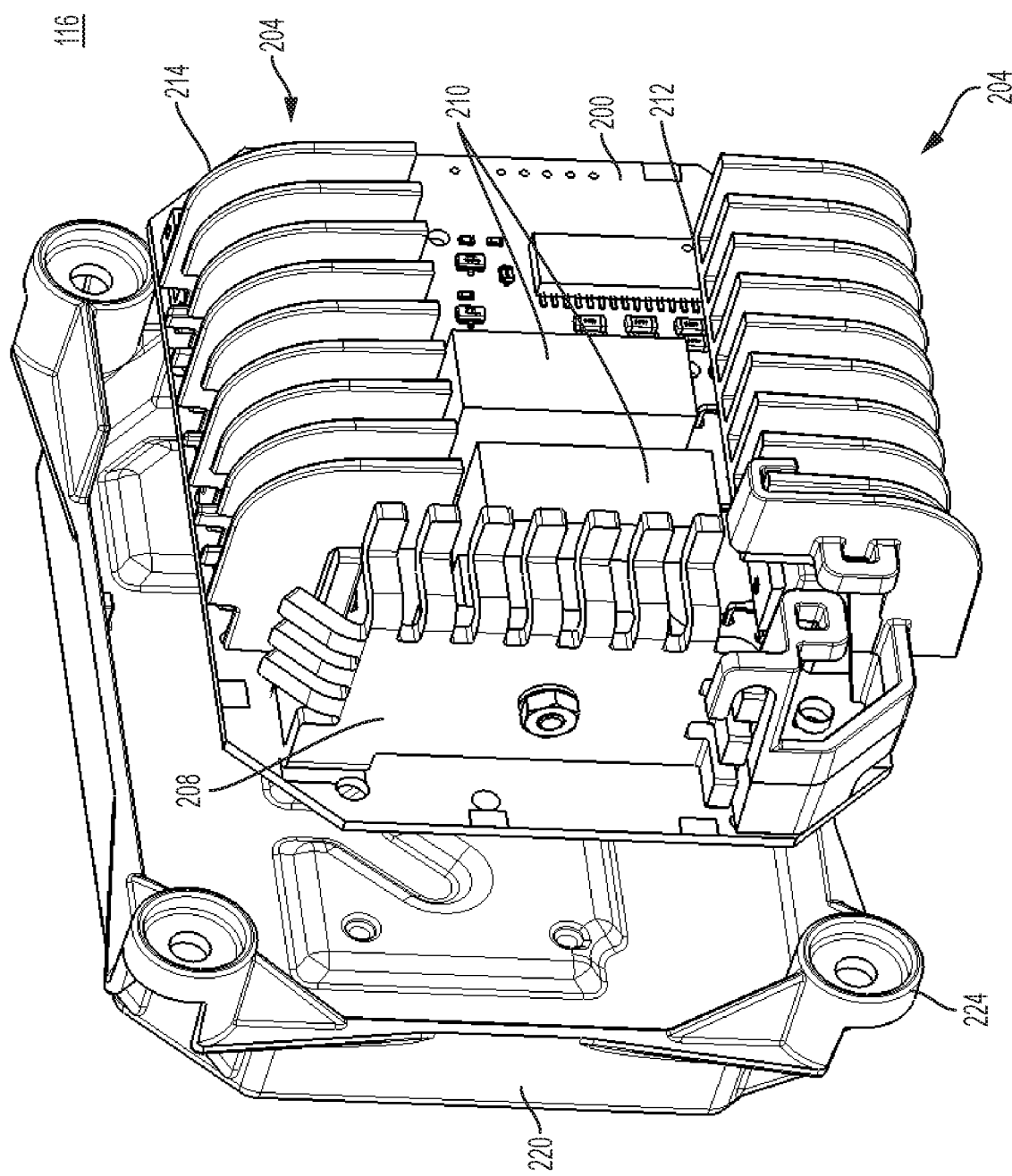

FIGS. 11 and 12 depict exploded perspective views of the motor control and power module 116 only, according to an embodiment. Details of the motor control and power module 116 are discussed herein with reference to FIGS. 11 and 12, with continued reference to FIGS. 7-10.

In an embodiment, control and power module 116 includes a printed circuit board (PCB) 200 having a series of power switches 202, i.e., transistors, such as Field Effect Transistors (FETs) or Insulated-Gate Bipolar Transistors (IGBTs) mounted thereon. Power switches 202 may be configured, for example, as a three-phase bridge driver circuit including three high-side and three low-side power switches 202 connected to drive the three phases of the motor 110. In an embodiment, the gates of the power switches 202 may be driven by a series of six control signals from a controller (e.g., a micro-controller or other programmable module) located either within the power module 116 or at a different location within the power tool. Examples of such a circuit may be found in US Patent Publication No. 2013/0342144, which is incorporated herein by reference in its entirety.

In an embodiment, circuit board 200 is electrically coupled to a power source (e.g., a battery pack) via power lines (not shown) for supplying electric power to the power switches 202. Circuit board 200 is also electrically coupled to input terminals 137 of the motor 110 to power the phases of the motor 110 via the power switches 202.

According to an embodiment, a power tool employing the motor assembly 100 described herein is a high-power tool configured to receive a 60V max battery pack or a 60V/20V convertible battery pack configured in its 60V high-voltage-rated state. Alternatively and/or additionally, the power tool may be configured to receive a 120V max battery pack, two 60V max battery packs connected in series for a total of 120V max DC power, or two 60V/20V convertible battery pack configured in their 60V high-voltage-rated state and connected in series for a total of 120V max DC power. The power tool may additionally and/or alternatively be coupled to a 120V or 230V AC power supply.

The motor 110 is accordingly configured for a high-power application with an appropriate stack length, winding sizes, and number of winding turns. Similarly, the power switches 202 are appropriately chosen in accordance with the rated voltage of the power supply. Larger rated voltage power supply typically requires larger transistors that also generate more heat. A pair of appropriately sized heat sinks 204 is accordingly mounted on the circuit board 200 to carry heat away from the power switches 202. Heat sinks 204, in an embodiment, may include a curved surface 212 that substantially covers a side surface and a top surface of the power switches 202, and a plurality of fins 214 projecting outwardly from the curved surface 212 to substantially increase the total surface area of the heat sink 204.

In an embodiment, where the power tool is an AC/DC system (i.e., power is supplied via an AC and/or DC power supply) or AC-only system (i.e., power is supplied via only an AC power supply), power module 116 may further include a bridge rectifier component 206 mounted on the circuit board 200. The bridge rectifier component 206 may include four diodes arranged in a bridge to convert negative half cycles of the AC waveform to positive half cycles. In an embodiment, power module 116 may further include an additional heat sink 208 mounted on the circuit board 200 adjacent the bridge rectifier component 206 to carry heat away from the diodes. In an embodiment, power module 116 may further include one or more DC bus capacitors 210 (in this case three capacitors 210 connected in series) mounted on the circuit board 200 and electrically connected across the bridge rectifier component 206. For more details on circuit components and connectivity of the power module 116, reference is made to Ser. No. 14/715,258 filed May 18, 2015, which is incorporated herein by reference in its entirety.

In an embodiment, control and power module 116 further includes a rear cover 220 designed to house the circuit board 200 therein. The rear cover 220 includes retaining features 222 designed to mate with and hold the edges of the circuit board 200, and through-holes 224 arranged to mate with corresponding fastener receptacles described below.

Figure 13:
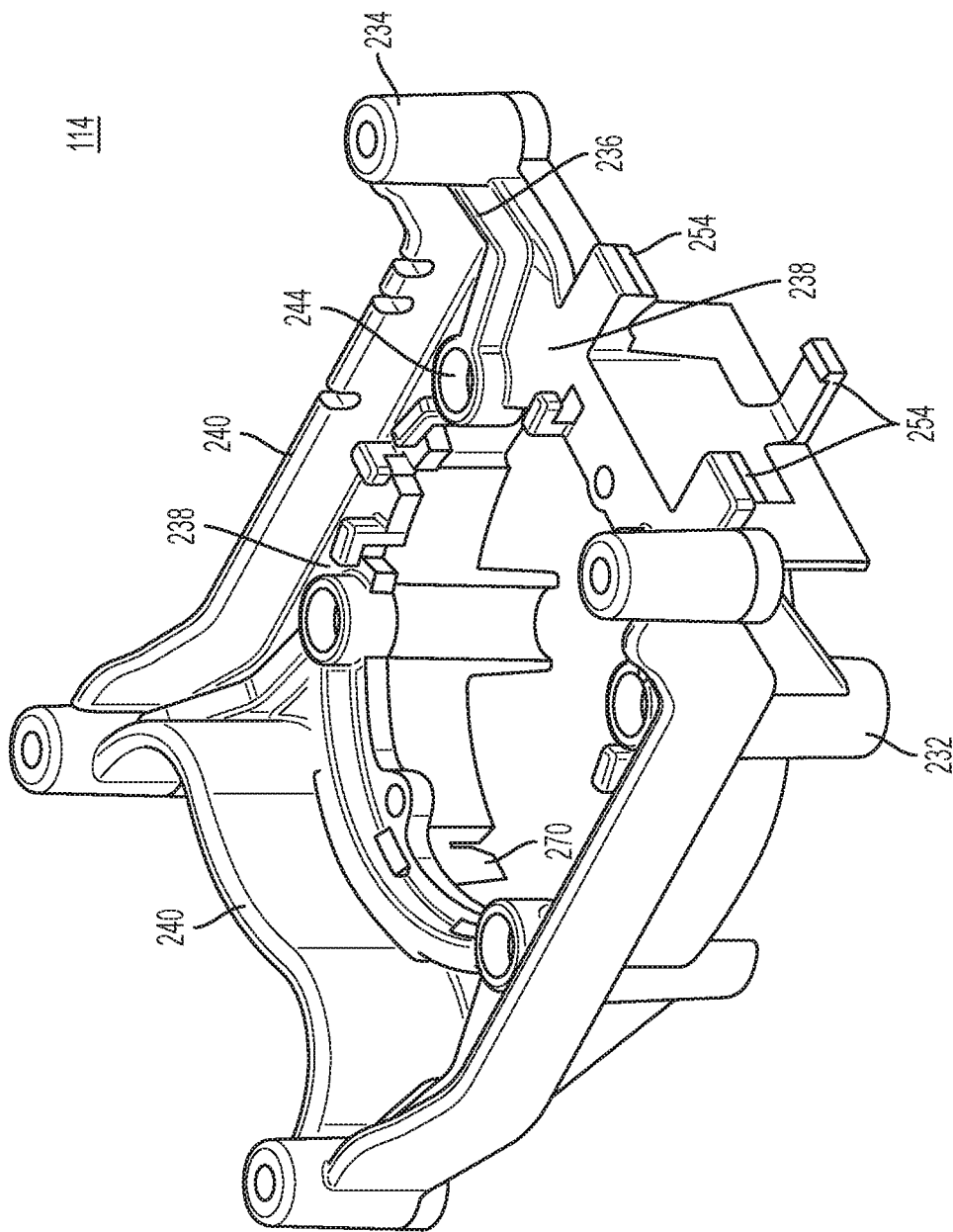
FIG. 13 depicts a perspective view of a mounting bracket, according to an embodiment.
Figure 14:
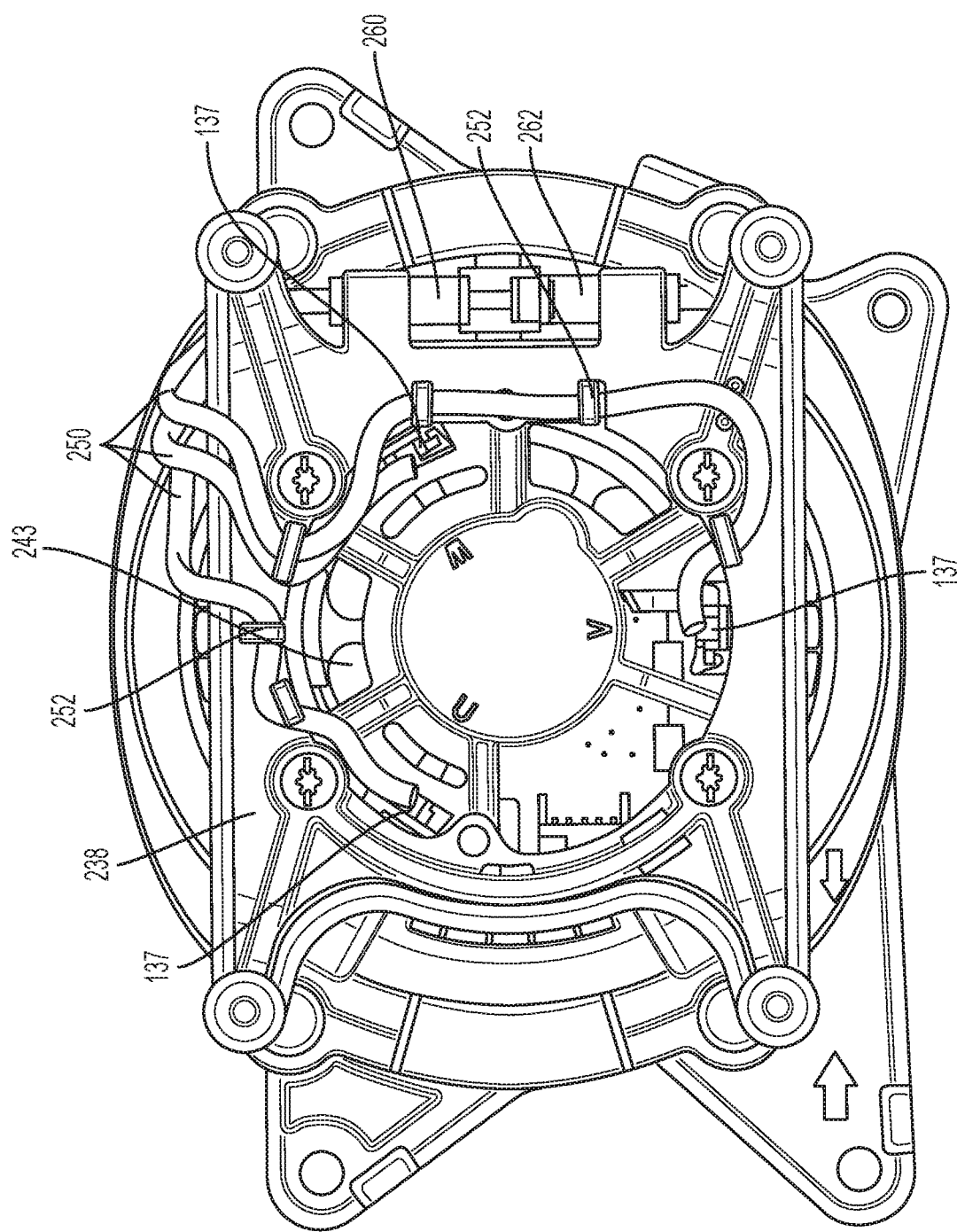
FIG. 14 depicts a rear axial view of the mounting bracket mounted on the motor housing, according to an embodiment.

Referring again to FIGS. 7-10, and further with reference to FIGS. 13 and 14, mounting bracket 114 is described herein, according to an embodiment of the invention.

FIG. 13 depicts a perspective view of the mounting bracket 114, alone, according to an embodiment.

FIG. 14 depicts a rear axial view of the mounting bracket 114 mounted on the motor housing 120, according to an embodiment.

In an embodiment, mounting bracket 114 includes a substantially cylindrical portion 230 facing the motor 110 arranged to mate around a circumferential portion of the motor housing 120 at its rear end. The cylindrical portion 230 includes four legs 232 that mate with and slide over corresponding guide rails 122 on the motor housing 120. At distal ends of the legs 232 are disposed four fastening receptacles 244 that allow the mounting bracket 114 to be secured to the end of the motor housing 120 via fasteners 246.

In an embodiment, extending opposite the motor 110, mounting bracket 114 includes a planar portion 238 and four mount posts 236 extending outwardly from the planar portion 238. In an embodiment, mount posts 236 may extend radially, i.e., at an angle with respect to the planar portion 238. In an embodiment, mount posts 236 are arranged around a circumference that has a larger diameter than a circumference of the legs 232. Mount posts 236 include fastener receptacles 234 arranged to mate with through-holes 224 of the rear cover 220 of the control and power module 116 to receive fasteners therethrough.

In an embodiment, disposed between adjacent mount posts 236 of the mounting bracket 114 are axial walls 240 and/or openings 242 positioned to direct air flow through the control and power module 116. Specifically, by disposing openings 242 adjacent the heat sinks 204 and/or 208, the mounting bracket 114, including the inner surface of the wall 240, planar portion 238, and cylindrical portion 230, act as baffling elements to direct the air flow generated by the motor fan 150 to enter through the control and power module 116, particularly in areas around the heat sinks 204 and 208, prior to entering the motor 110 through openings 243 in the rear end of the motor housing 120. Walls 240 and openings 242 are sized appropriately according to the size of the nearest heat sink 204 or 208. In an embodiment, two opposing walls 240 adjacent heat sinks 204 have a smaller length to provide a larger opening 242 as compared to wall 240 opposite heat sink 208. In this manner, mounting bracket 114 directs air flow generated by the motor fan 150 through the control and power module 116 to help carry heat away from the heat sinks 204, 208, and therefore the power components on the circuit board 200.

In an embodiment, mounting bracket 114 also provides wire routing and connectivity features between the motor 110 and the control and power module 116. In an embodiment, motor wires 250 coming out of the input terminals are routed through routing features 252 provided on a rear surface of the planar portion 238 of the mounting bracket 114, and are guided to motor-side male connector 260 on the side of the mounting bracket 114. Male connector 260 is snap-fittingly secured to an outer surface of the cylindrical portion 230 of the mounting bracket 114 via retaining features 254. The female connector 262 of motor control and power module 116 is similarly secured to the outer surface of the cylindrical portion 230. Female connector 262 is coupled to power switches 202 of the motor control and power module 116 via motor drive wires 135 previously described. During the assembly processed, female connector 262 of the control and power module 116 mates with male connector 260 of the input terminals 137 of the stator assembly 130 to establish a connection between the control and power module 116 and the motor 110.

In an embodiment, mounting bracket 114 additionally or alternatively includes a pair of fingers 270 to hold a positional sensor board 280 within a slot 272 of the motor housing 120, as described below in detail.

Figure 15:
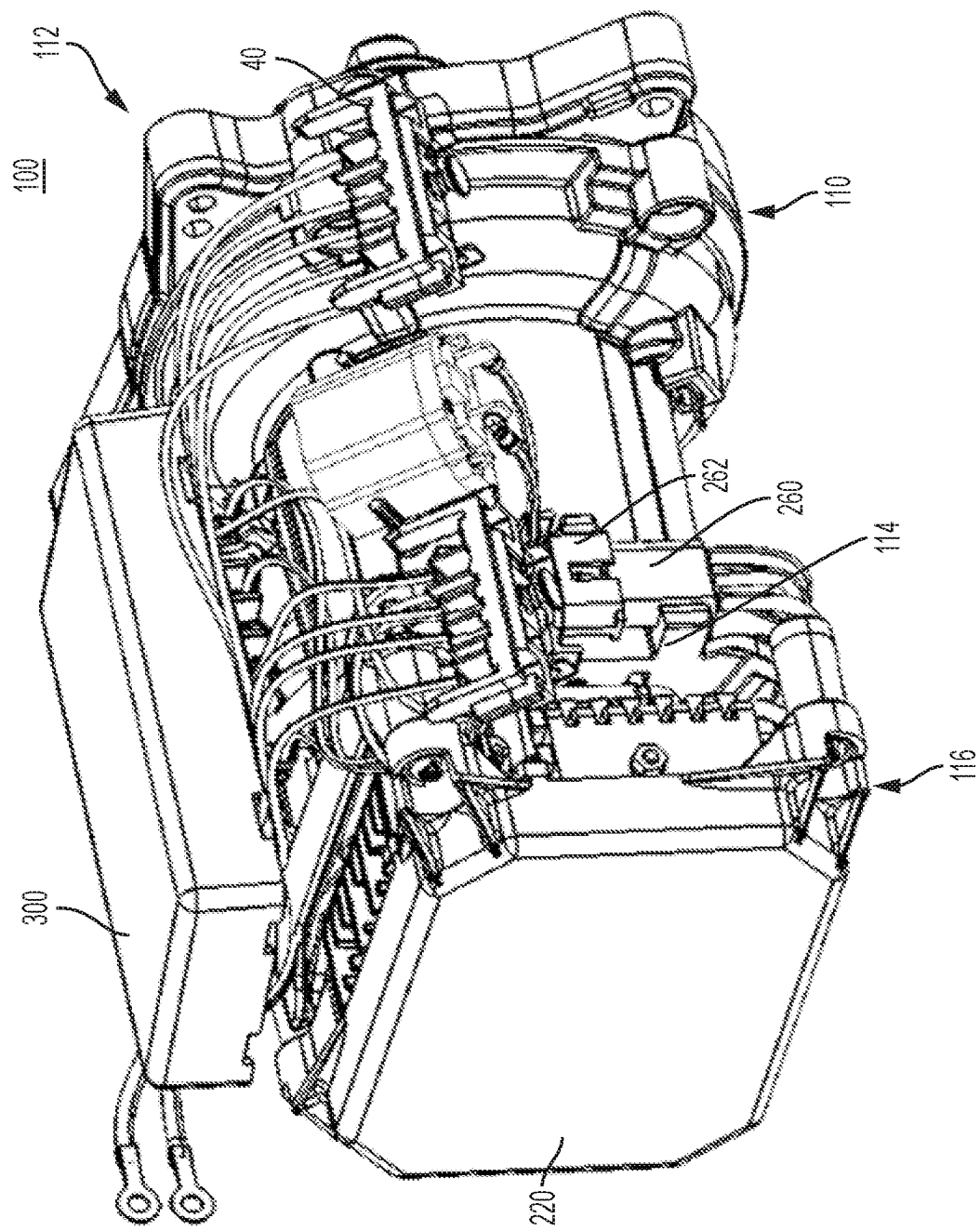
FIG. 15 depicts a perspective view of the battery management control module added to the motor assembly of FIG. 7.

FIG. 15 depicts a perspective of the brushless DC motor 110 and power module assembly 100 described above, additional provided with battery management control module 300, according to an embodiment. As seen herein, the battery management control module 300 is axially disposed along an outer surface of the motor housing 120.

Figure 16:
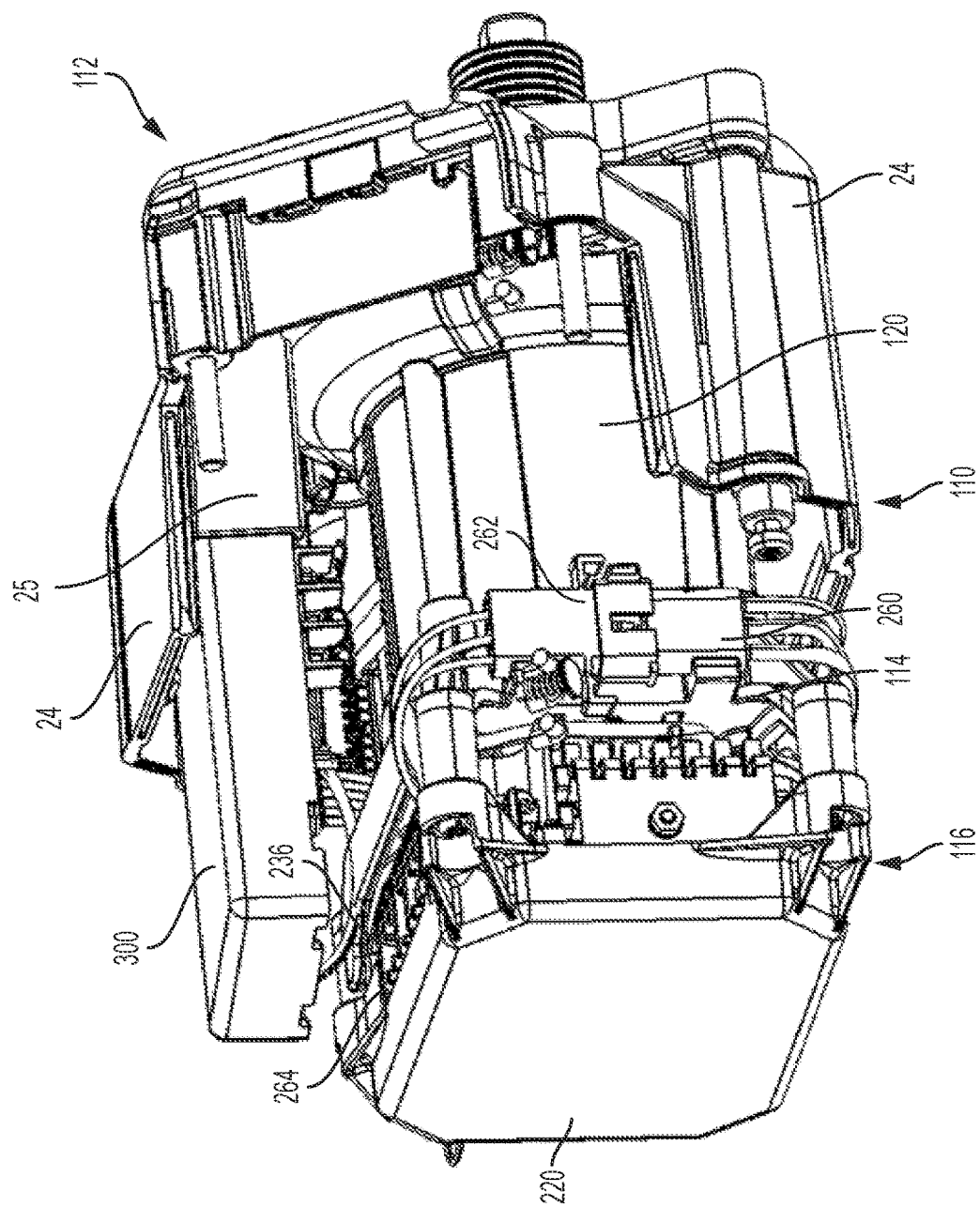
FIG. 16 depicts a partial perspective view of the tool housing receiving the motor assembly and battery management control module therein.

FIG. 16 depicts a partial perspective view of tool housing 24 receiving the brushless DC motor 110 and the battery management control module 300 therein, according to an embodiment. As seen herein, tool housing 24, a part of which is removed to expose the motor 110, the motor control and power module 116, and the battery management control module 300, includes an axial pocket 25 for receiving the battery management control module 300 therein in parallel to the motor housing 120.

Figure 17:
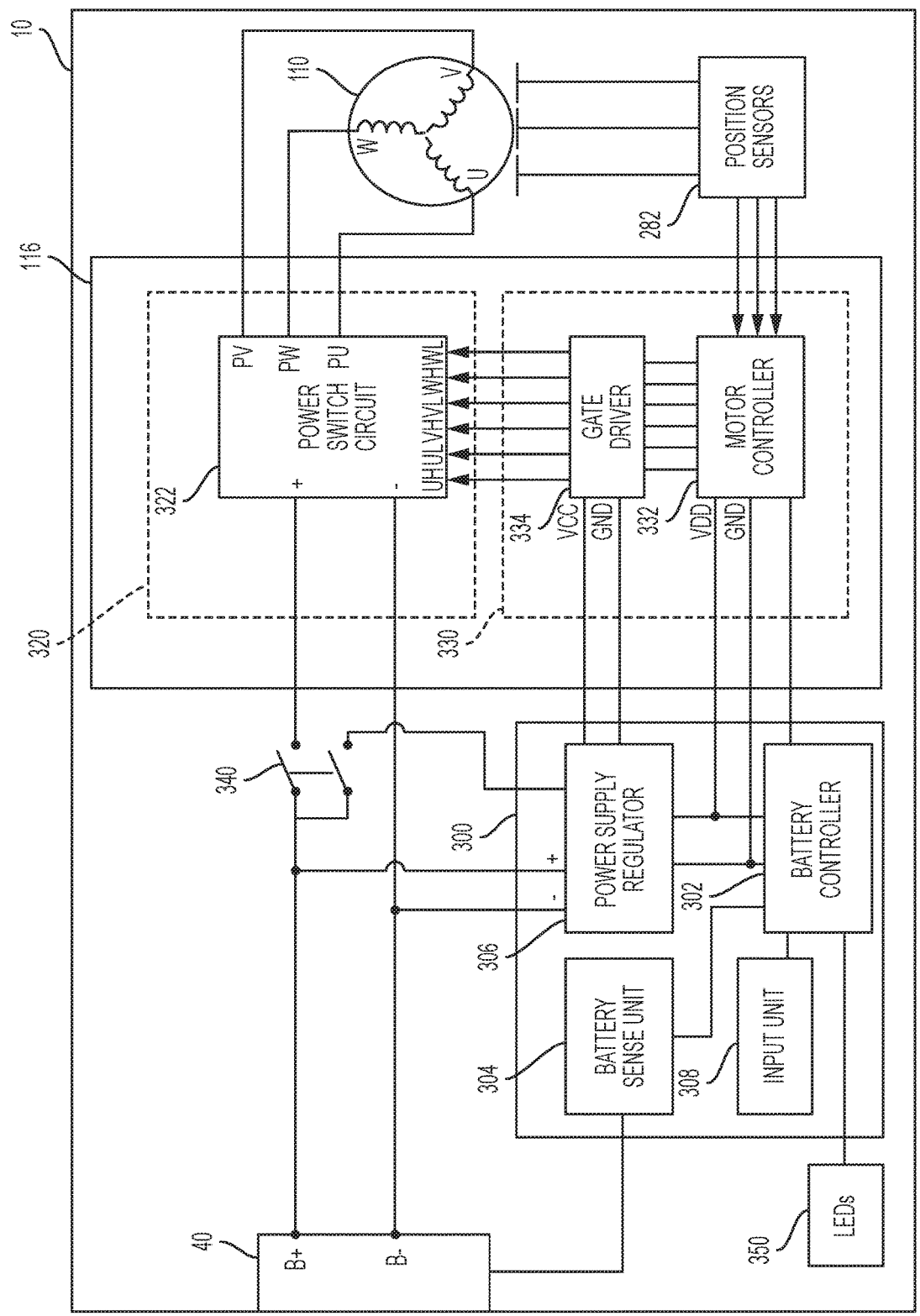
FIG. 17 depicts a block diagram for the battery management control module and the motor control and power module for the power tool, according to an embodiment.
Figure 18:
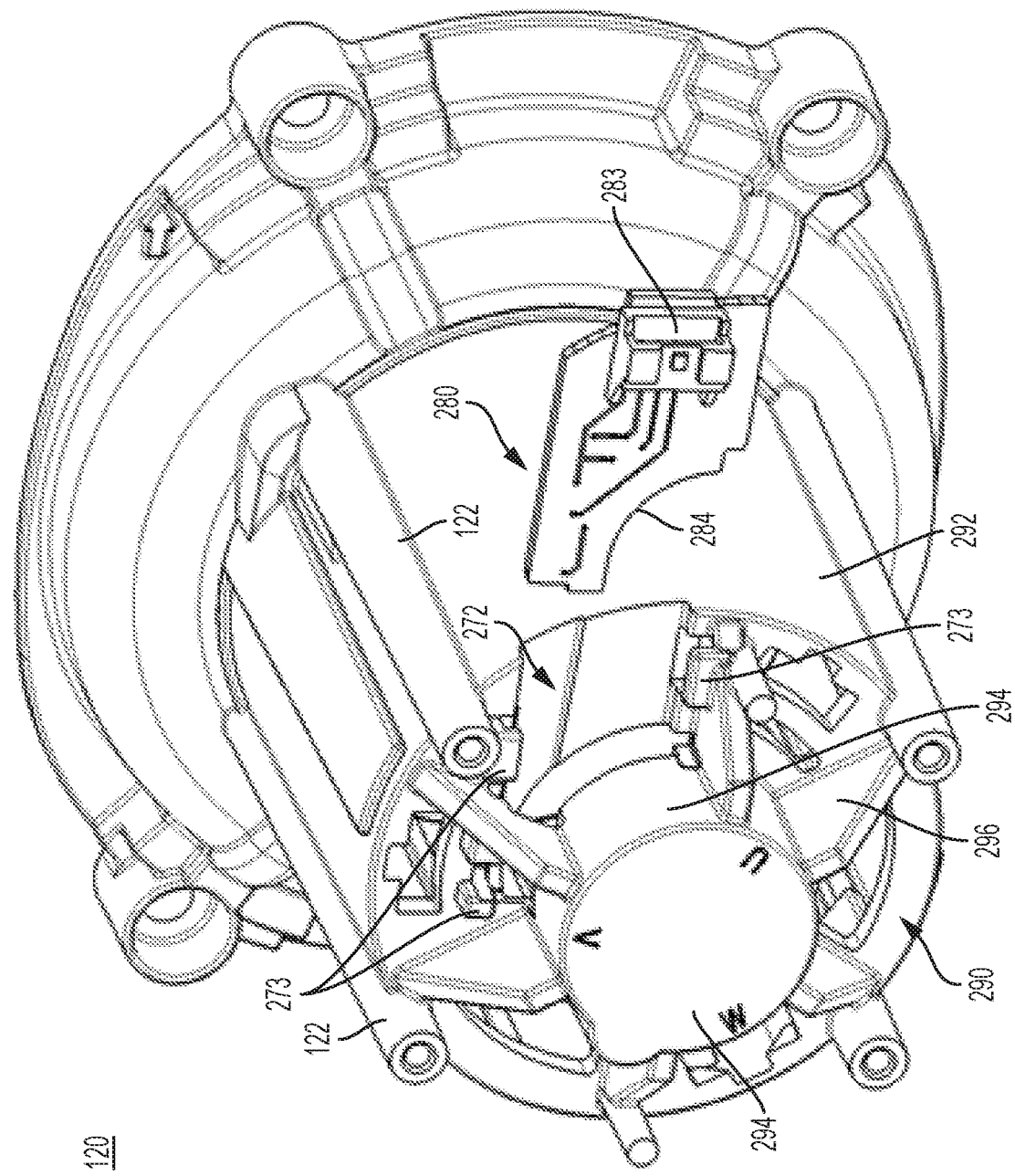
FIGS. 18 and 19 depict rear perspective views of the motor housing with a positional sensor board in unassembled and assembled states respectively, according to an embodiment.
Figure 19:
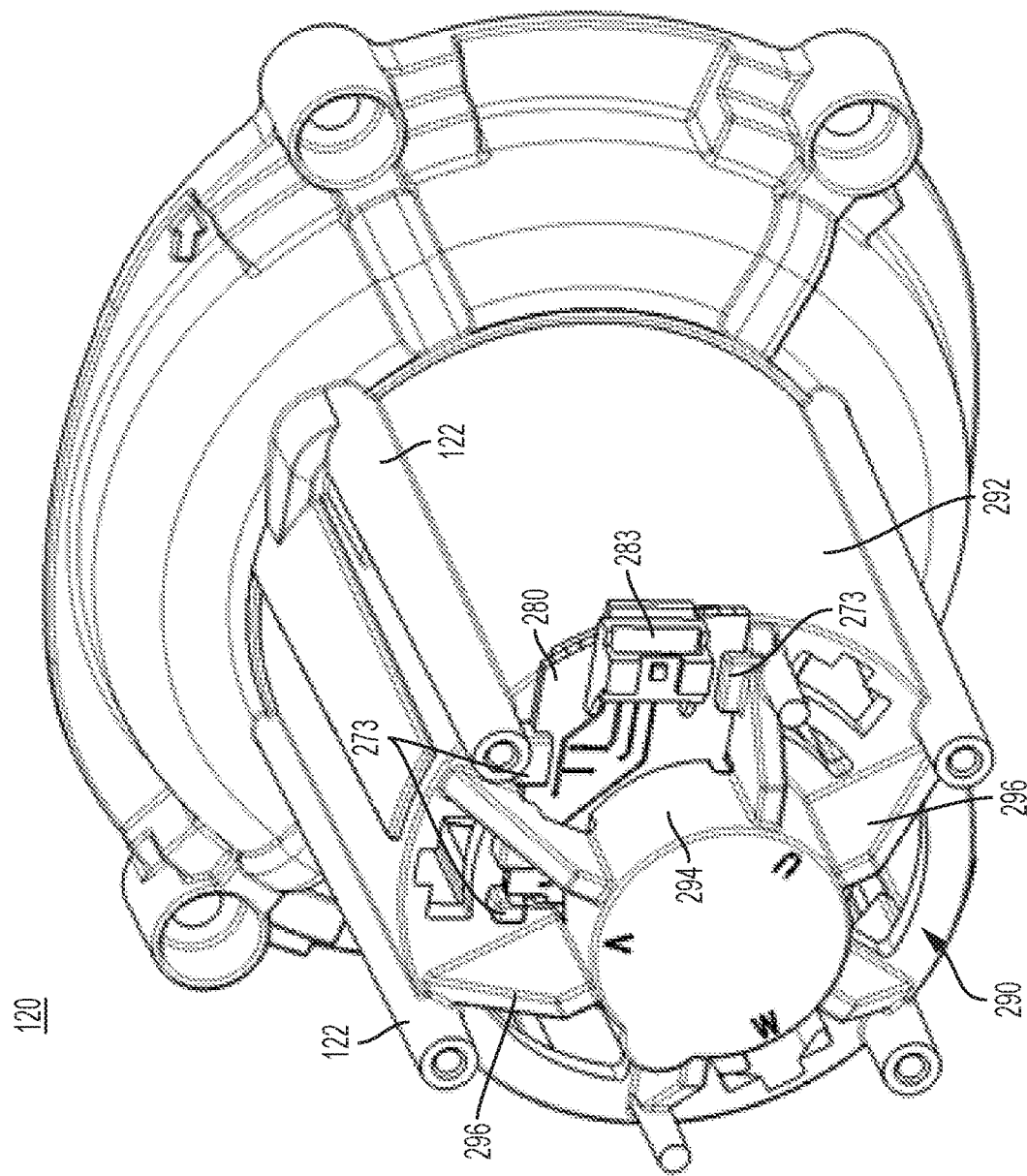
Figure 20:
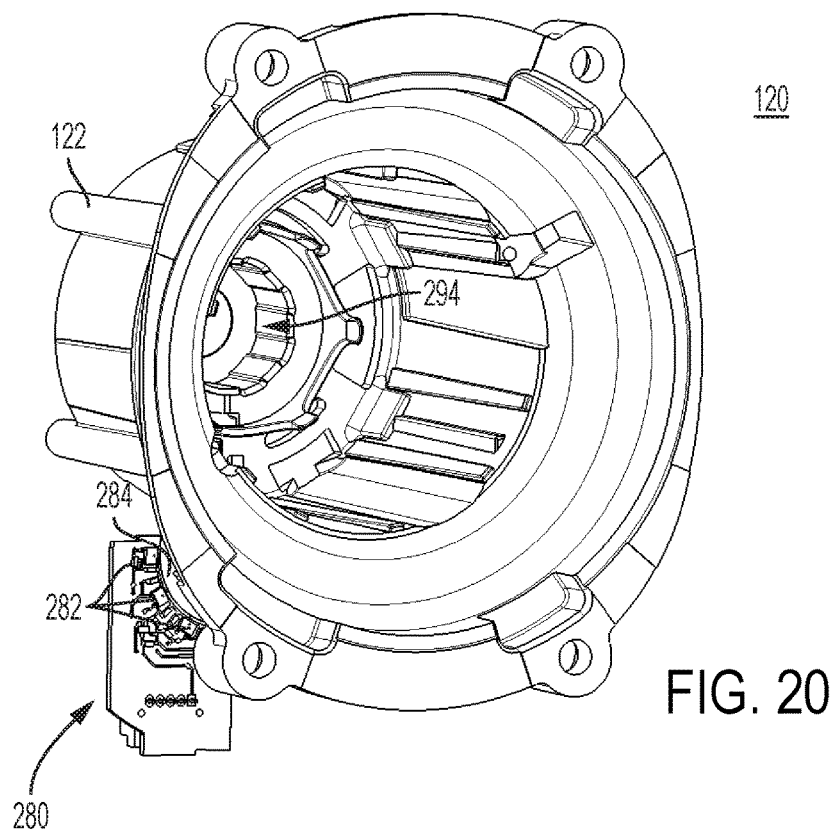
FIGS. 20 and 21 depict front perspective views of the motor housing with the positional sensor board in unassembled and assembled states respectively, according to an embodiment.
Figure 21:
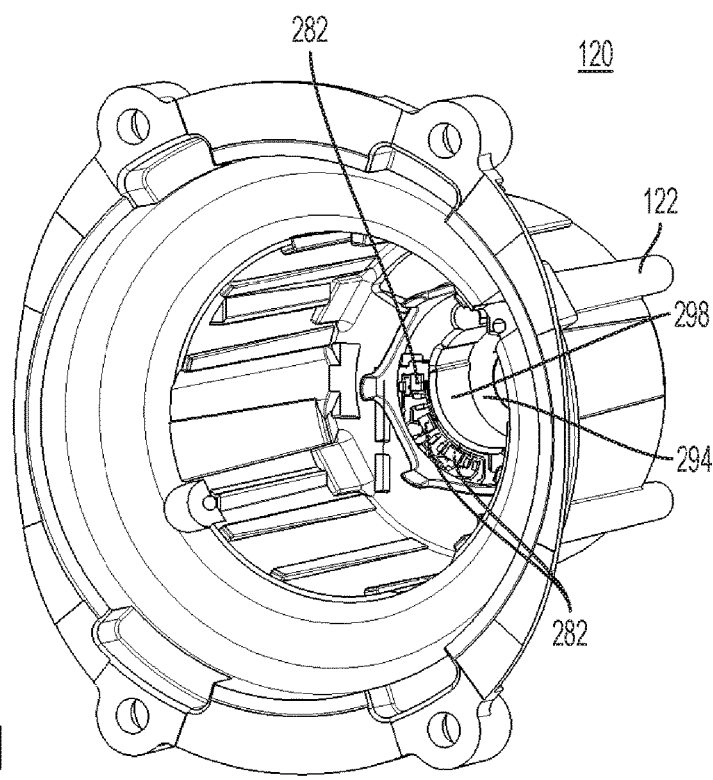

FIG. 17 depicts an exemplary block circuit diagram for a two-controller system of the present disclosure, according to an embodiment.

In an embodiment, motor control and power module 116 includes a power unit 320 and a control unit 330.

In an embodiment, power unit 320 may include a power switch circuit 322 coupled between the power source B+/B− terminals and motor windings to drive BLDC motor 110. In an embodiment, power switch circuit 322 may be a three-phase bridge driver circuit including six controllable semiconductor power switches 202 (e.g. FETs, BJTs, IGBTs, etc).

In an embodiment, control unit 330 may include a controller 332 and a gate driver 334. In an embodiment, controller 332 is a programmable device (e.g., a microcontroller, micro-processor, etc.) arranged to control a switching operation of the power devices in power switching circuit 322. In an embodiment, controller 332 handles all aspect of motor control, including, but not limited to, motor drive and commutation control (including controlling the switching operation of the power switching circuit 322 to control motor speed, forward/reverse drive, phase current limit, start-up control, electronic braking, etc.), motor stall detection (e.g., when motor suddenly decelerates or motor current rapidly rises), motor over-voltage detection and shutdown control, motor or module over-temperature detection and shutdown control, electronic clutching, and other control operations related to the motor.

In an embodiment, controller 332 receives rotor rotational position signals from a set of position sensors 282 provided in close proximity to the motor rotor 140, specifically from the sense magnet ring 146, as will be discussed later in detail. In an embodiment, position sensors 282 may be Hall sensors. It should be noted, however, that other types of positional sensors may be alternatively utilized. It should also be noted that controller 332 may be configured to calculate or detect rotational positional information relating to the motor 110 rotor without any positional sensors (in what is known in the art as sensorless brushless motor control). Based on the rotor rotational position signals from the position sensors 382, controller 332 outputs drive signals UH, VH, WH, UL, VL, and WL through the gate driver 334. Gate driver 334 is provided to output the voltage level needed to drive the gates of the semiconductor switches 202 in order to control a PWM switching operation of the power switch circuit 322.

In an embodiment, battery management control module 300 includes a battery controller 302 that is separate and distinct from the motor controller 332, a battery sense unit 304, a power supply regulator 306, and an input unit 308.

The power supply regulator 306 may include one or more voltage regulators to step down the power supply to a voltage level compatible for operating the two controllers 332 and 302 and/or the gate driver 334. In an embodiment, power supply regulator 306 may include a buck converter and/or a linear regulator to reduce the power voltage from the battery receptacle 40 down to, for example, 15V for powering the gate driver 334, and down to, for example, 3.3V for powering the controllers 302 and 332.

In an embodiment, battery controller 302, similarly to motor controller 232, is programmable device (e.g., a microcontroller, micro-processor, etc.) arranged to control various management aspects of the battery and the power tool. In an embodiment, controller 302 detects when the tool is turned on or off power switch 340 and initiates and/or cuts off supply of power to motor control and power module 116 accordingly. In an embodiment, battery controller accomplishes this by cutting off the supply of power to the motor controller 332 and/or gate driver 234 from the power supply regulator 306. The battery controller 302 may additionally or alternatively receive forward/reverse or trigger on/off signals from an input unit 308 coupled to a trigger switch. The battery controller 302 also receives sense signals of the battery packs via battery sense unit 304, determines if the battery is experiencing a fault condition (e.g., under-voltage, over-current, over-temperature, etc.), and shuts off the supply of power accordingly. In an embodiment, the two controllers 332 and 302 communicate via a serial communication protocol, e.g., Universal Asynchronous Receiver/Transmitter (UART). In an embodiment, battery controller 302 additionally controls other components such as LEDs 350 based on, for example, a state of charge of the battery 40.

The above-described embodiment allows for reduced overall wire length, minimizing wiring and routing cost and improving signal integrity of analog signals received by the controllers. Also, the size of the larger bus lines is substantially reduces, e.g., by 2 to 6 inches. These include battery control wires 131, which include a total of seven wires for battery voltage and temperature sensing of the two battery packs; motor control wires 133, which include five wires for hall sensors; and motor drive wires 135, which include three high-current wires. Reducing the size of these wires according to this design minimizes the noise on the motor and battery signals, thus improving system reliability and accuracy.

It is noted that while the circuit diagram of FIG. 17 is designed for a power tool that receives DC power, the principle teachings of this disclosure may similarly be applied to an AC/DC power tool capable of receiving AC or DC power, where the AC power is passed through a rectifier circuit. Examples of such a system are described in PCT Application Publication No. WO 2015/179318 filed May 18, 2015, which is incorporated herein by reference in its entirety.

The structure and assembly of positional sensor board 280 is described herein, according to an embodiment of the invention.

Referring to FIGS. 18-21, which show perspective front and back view of the motor housing 120, without the stator assembly 130 or rotor assembly 140 mounted therein, respectively depict positional sensor board 280 disposed outside and inside the slots 272 of the motor housing 120, according to an embodiment. In an embodiment, slot 272 is located radially on the motor housing 120 at or near rear end 290 of the motor housing 120. In the illustrated embodiment, the slot 272 is formed integrally as a recessed surface on the rear end 290, though it must be understood that the slot 272 may be disposed on the outer surface 292 of the motor housing 120 at a short distance to the rear end 290.

In an embodiment, positional sensor board 280 includes a series of three positional sensors (e.g., three Hall sensors) 282 on a surface thereof facing the rotor assembly 140. In an embodiment, positional sensor board 280 is received radially through the slot 272 such that positional sensors 282 are exposed inside the motor housing 120 to the rotor assembly 140 sense magnet ring 148. In an embodiment, the motor housing 120 includes guide and retention features 273 around the slot 272 to radially receive and retain the positional sensor board 280 within the slot 272. In an embodiment, positional sensor board 280 also includes a connector 283 on a surface thereof opposite the positional sensors 282.

In an embodiment, positional sensor board 280 includes a curved inner edge 284 and the positional sensors 282 are arranged around the curved inner edge. In an embodiment, curved inner edge 284 is on a corner portion of the positional sensor board 280 to give the positional sensor board 280 an asymmetric shape. In an embodiment, slot 272 is disposed in the motor housing 120 offset with respect to a center of the motor housing 120 such that a receiving axis of the slot 272 does not intersect the center of the bearing pocket 294 (i.e., axis of the motor shaft 142).

In an embodiment, bearing pocket 294 is located downstream from the rear end 290 of the motor housing 120 from the rotor assembly 140. In an embodiment, bearing pocket 294 is a cylindrically-shaped member that projects from the rear end 290 of the motor housing 120 and is additionally supported via angular legs 296. In an embodiment, slot 272 extends partially on the rear end 292 and partially on the outer surface of the bearing pocket 294.

In an embodiment, when positional sensor board 280 is received through the slot 272, its curved edge 284 comes to contact with an inner ring 298 of the bearing pocket 294, and thus the positional sensors 282 are positioned outside the inner ring 298 of the bearing pocket 294. This arrangement allows the positional sensors 282 to be disposed at close axial proximity to the sense magnet 148 of the rotor assembly 150 when fully assembled. Furthermore, the curved edge 284 of the positional sensor board 280 ensures that the positional sensor board 280 does not interfere with the assembly of the rotor assembly 140 in the motor housing 120. In particular, the curved edge 284 of the positional sensor board 280 allows the rear bearing 146 to pass by the positional sensor board 280 and be axially received into the bearing pocket 294.

While the positional sensor board 280 in the above-described includes a curved edge to be disposed round the inner ring 298 of the bearing pocket 294, positional sensor board 280 may alternatively be rectangular shaped such that, once received inside the slot 272, it axially overlaps the bearing pocket 294. In this embodiment, during the assembly process, the positional sensor board 280 is inserted into the slot 272 after the rotor assembly 140 is assembled into the motor housing 120 so that the positional sensor board 280 does not interfere with insertion of the rear bearing 146 into the bearing pocket 294.

In an embodiment, as briefly discussed above, mounting bracket 114 includes a pair of fingers 270 to hold a positional sensor board 280 within a slot 272 of the motor housing 120. Fingers 270 are spaced apart to allow access to connector 283 when fully assembled.

Figure 22:
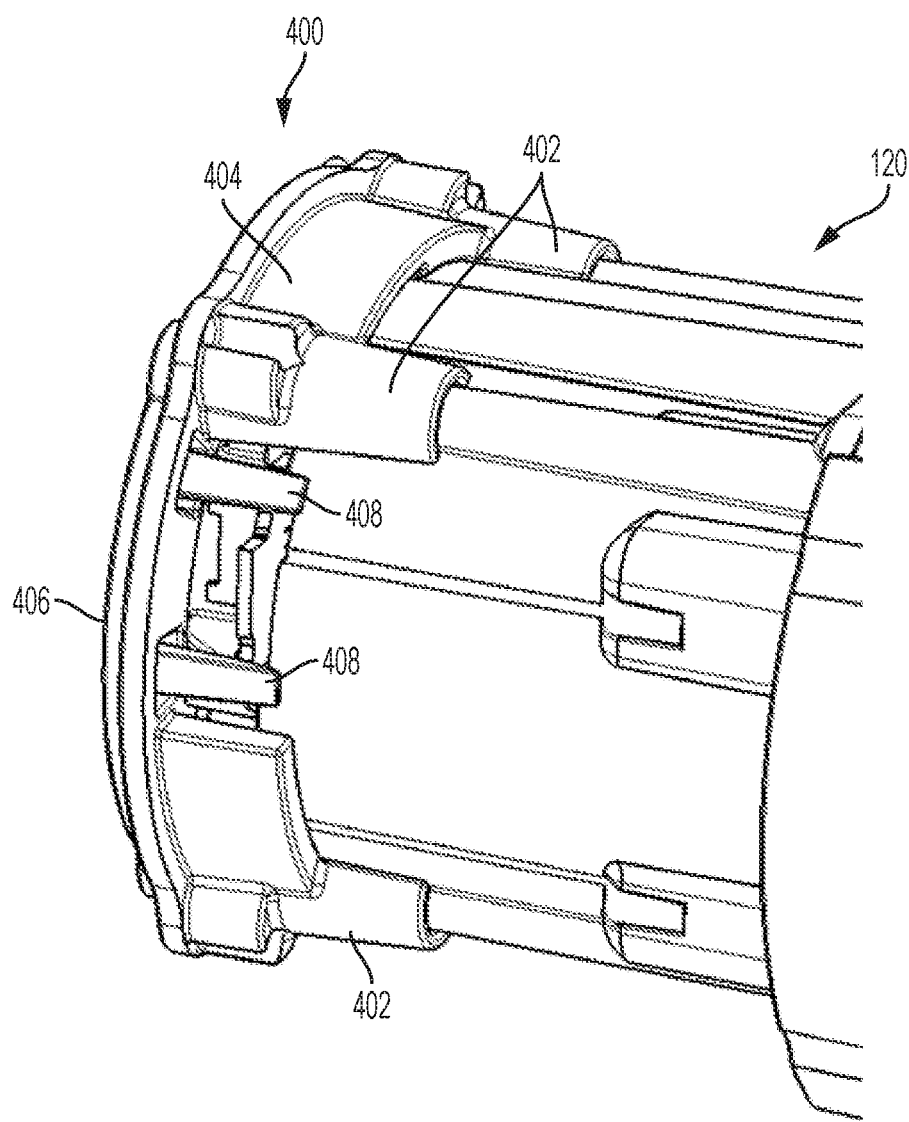
FIG. 22 depicts a perspective view of the motor housing with an alternative bracket, according to an embodiment.

Referring now to FIG. 22, an alternative bracket 400 is described herein. Bracket 400 is similar to mounting bracket 114, but does not provide mounting support for a control and power module. Such a bracket 400 may be utilized in power tools where the control and power circuitry is located at another part of the tool rather than the back of the motor housing, or where the power module is secured on the back of the motor directly to the tool housing. In an embodiment, bracket 400 includes legs 402, cylindrical portion 404, and planar portion 406 similarly to mounting bracket 114 described above. Bracket 400 may house connectors (not shown) between the motor and the power module, as described above. Bracket 400 also includes fingers 408 disposed to hold the positional sensor board 280 in place, as described above.

Some of the techniques described herein may be implemented by one or more computer programs executed by one or more processors residing, for example on a power tool. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
   a tool housing;
   a motor housing disposed within the tool housing and having a substantially-cylindrical main body having an open end and a rear end at least partially closing the main body disposed opposite the open end;
   a brushless DC (BLDC) motor disposed within the motor housing, the motor including: a stator assembly received through the open end of the motor housing and secured within the main body, and a rotor assembly rotatably disposed within the stator assembly;
   a motor control and power module disposed proximate the rear end of the motor housing, the motor control and power module comprising a printed circuit board (PCB), a power switch circuit including a plurality of semiconductor switches electrically mounted on the PCB and coupled to the motor, and a controller being a programmable device also mounted on the PCB and configured to output a plurality of drive control signals to operate the plurality of semiconductor switches to supply power from a power source to the motor; and
   a mounting bracket secured to the motor housing at the rear end thereof, the mounting bracket supporting the motor control and power module such that the PCB is substantially parallel to the rear end of the motor housing, the mounting bracket comprising a mating portion projecting axially to come to contact with the motor housing around the rear end thereof to structurally support the mounting bracket with respect to the motor housing.

2. The power tool of claim 1, wherein the mating portion comprises a substantially cylindrical portion arranged to mate around a circumferential portion of the motor housing at or near the rear end of the motor housing.

3. The power tool of claim 2, wherein the motor housing comprises a plurality of guide rails on its outer surface, and the cylindrical portion comprises a plurality of legs that slidingly mate with the guide rails of the motor housing.

4. The power tool of claim 2, wherein the mounting bracket further comprises a planar portion extending radially outwardly from the substantially cylindrical portion, and a plurality of mount posts located around the planar portion.

5. The power tool of claim 4, wherein the plurality of mount posts extends outwardly at an angle from the planar portion.

6. The power tool of claim 5, wherein the plurality of mount posts is arranged along a circumference having a larger diameter than the substantially cylindrical portion.

7. The power tool of claim 4, further comprising a rear cover configured to mate with the plurality of mount posts to support the motor control and power module proximate the rear end of the motor housing.

8. The power tool of claim 7, wherein the power switch circuit comprises a plurality of Insulated-Gate Bipolar Transistors (IGBTs) configured as a three-phase bridge driver circuit, and at least one heat sink mounted on the PCB in thermal communication with the IGBTs, the rear cover and the mounting bracket together defining at least one peripheral opening adjacent the motor control and power module to allow passage of air to the heat sink.

9. The power tool of claim 8, wherein the at least one heat sink includes a curved surface that substantially covers a side surface and a top surface of the plurality of IGBTs, and a plurality of fins projecting outwardly from the curved surface.

10. The power tool of claim 8, wherein the motor further comprises a fan rotatably coupled to the rotor assembly generating an airflow path, and the rear end of the motor housing comprises at least one opening to provide fluid communication between the motor fan and the motor control and power module to provide the airflow path through the at least one peripheral opening in contact with the heat sink, through the mounting bracket, and into the motor housing.

11. The power tool of claim 2, wherein the substantially cylindrical portion is sized to fittingly receive the rear end of the motor housing therein.

12. The power tool of claim 2, further comprising a plurality of motor terminals axially extending from the stator assembly and protruding through a plurality of openings of the rear end of the motor housing, the plurality of motor terminals being received within the substantially cylindrical portion of the mounting bracket and electrically coupled to the power switch circuit via a plurality of motor wires.

13. The power tool of claim 1, wherein the mounting bracket comprises wire routing and retention features on an inner portion thereof for receiving motor wires from the motor.

14. The power tool of claim 1, further comprising at least one battery receptacle accommodated on the tool housing, the battery receptacle being adapted to receive a battery pack having a maximum voltage of at least 60 volts.

15. The power tool of claim 14, further comprising a battery management module comprising a secondary printed circuit board (PCB) disposed within the tool housing near the battery receptacle and at a distance from the PCB, and a battery-management controller being a programmable device mounted on the secondary PCB, the second controller being configured to receive a signal related to at least one of a temperature or voltage of the battery pack from the battery receptacle and mange an operation of the battery pack accordingly.

16. The power tool of claim 15, wherein the battery management module is disposed along a plane that is substantially perpendicular to the PCB.

17. The power tool of claim 1, wherein the motor housing comprises a radially-extending slot formed at or near the rear end thereof, the power tool further comprising a positional sensor board radially received within the slot and a plurality of positional sensors mounted on the positional sensor board.

18. The power tool of claim 17, wherein the mounting bracket comprises at least one axially-projecting finger arranged to engage an outer end of the positional sensor board to hold the positional sensor board within the slot.

* * * * *